US010812742B2

(12) United States Patent
Chen et al.

(10) Patent No.: US 10,812,742 B2
(45) Date of Patent: Oct. 20, 2020

(54) APPARATUS AND METHOD FOR DETERMINING WHETHER A PHOTODIODE SATURATES AND OUTPUTTING A DIGITAL VALUE REPRESENTING A CHARGE FROM THAT PHOTODIODE BASED ON THAT DETERMINATION

(71) Applicant: Facebook Technologies, LLC, Menlo Park, CA (US)

(72) Inventors: Song Chen, Redmond, WA (US); Xinqiao Liu, Medina, WA (US); Wei Gao, Bothell, WA (US); Andrew Samuel Berkovich, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/382,015

(22) Filed: Apr. 11, 2019

(65) Prior Publication Data

US 2019/0327439 A1 Oct. 24, 2019

Related U.S. Application Data

(60) Provisional application No. 62/659,695, filed on Apr. 18, 2018.

(51) Int. Cl.
*H04N 5/335* (2011.01)
*H04N 5/359* (2011.01)
*H04N 5/235* (2006.01)

(52) U.S. Cl.
CPC ......... *H04N 5/3591* (2013.01); *H04N 5/2353* (2013.01)

(58) Field of Classification Search
CPC .................................................. H04N 5/3591
See application file for complete search history.

(56) References Cited

U.S. PATENT DOCUMENTS 9,497,396 B2 * 11/2016 Choi ................. H01L 27/14609
9,948,316 B1 4/2018 Yun et al.
(Continued)

FOREIGN PATENT DOCUMENTS

EP 1732134 A1 12/2006

OTHER PUBLICATIONS

International Application No. PCT/US2019/027729, International Search Report and Written Opinion dated Jun. 27, 2019, 10 pages.
(Continued)

*Primary Examiner* — Gary C Vieaux
(74) *Attorney, Agent, or Firm* — Kilpatrick Townsend & Stockton LLP

(57) ABSTRACT

In one example, an apparatus comprises: a photodiode, a charge storage unit, and an analog-to-digital converter (ADC) circuit. In a first mode, the ADC circuit can compare a first voltage representing a quantity of the overflow charge stored at the charge storage unit against a first ramping voltage to generate a first decision; and obtain, based on the first decision output, a first digital value. In a second mode, the ADC circuit can compare a second voltage representing a quantity of residual charge stored in the photodiode against a second ramping voltage to generate a second decision, and obtain, based on the second decision, a second digital value. The ADC circuit can determine, based on one of the first decision output or the second decision output, whether the photodiode saturates, and output one of the first digital value or the second digital value to represent an intensity of incident light.

20 Claims, 19 Drawing Sheets

(56) References Cited

U.S. PATENT DOCUMENTS

| | | | |
|---|---|---|---|
| 10,574,925 B2* | 2/2020 | Otaka | H04N 5/3591 |
| 2006/0158541 A1 | 7/2006 | Ichikawa | |
| 2007/0076481 A1 | 4/2007 | Tennant | |
| 2007/0102740 A1 | 5/2007 | Ellis-Monaghan et al. | |
| 2009/0261235 A1* | 10/2009 | Lahav | H04N 5/37455 |
| | | | 250/208.1 |
| 2012/0068051 A1* | 3/2012 | Ahn | H01L 27/14609 |
| | | | 250/208.1 |
| 2014/0021574 A1 | 1/2014 | Egawa | |
| 2016/0111457 A1 | 4/2016 | Sekine | |
| 2016/0204150 A1 | 7/2016 | Oh et al. | |
| 2016/0337605 A1 | 11/2016 | Ito | |
| 2018/0376046 A1* | 12/2018 | Liu | H04N 5/37455 |
| 2019/0355782 A1* | 11/2019 | Do | H04N 5/37452 |

OTHER PUBLICATIONS

International Application No. PCT/US2018/064181, "International Search Report and Written Opinion", dated Mar. 29, 2019, 12 pages.

* cited by examiner

APPARATUS AND METHOD FOR DETERMINING WHETHER A PHOTODIODE SATURATES AND OUTPUTTING A DIGITAL VALUE REPRESENTING A CHARGE FROM THAT PHOTODIODE BASED ON THAT DETERMINATION

RELATED APPLICATION

This patent application claims priority to U.S. Provisional Patent Application Ser. No. 62/659,695, filed Apr. 18, 2018, entitled "DETECTING OVERFLOW FROM PHOTODIODE TO FLOATING DIFFUSION IN DIGITAL PIXEL SENSOR," which is assigned to the assignee hereof and is incorporated herein by reference in its entirety for all purposes.

BACKGROUND

The disclosure relates generally to image sensors, and more specifically to pixel cell structure including interfacing circuitries for determining light intensity for image generation.

A typical image sensor includes a photodiode to sense incident light by converting photons into charge (e.g., electrons or holes). The image sensor further includes a floating node configured as a capacitor to collect the charge generated by the photodiode during an exposure period. The collected charge can develop a voltage at the capacitor. The voltage can be buffered and fed to an analog-to-digital converter (ADC), which can quantize the voltage into a digital value representing the intensity of the incident light. The accuracy of the quantization, however, can be affected by various noise sources, such as dark current at the floating node.

SUMMARY

The present disclosure relates to image sensors. More specifically, and without limitation, this disclosure relates to a pixel cell. This disclosure also relates to operating the circuitries of pixel cells to measure the intensity of incident lights in different measurement modes.

The present disclosure provides an apparatus for measuring intensity of incident light. In one example, the apparatus comprises: a photodiode, a charge storage unit, and an analog-to-digital converter (ADC) circuit. In a first mode of measurement, the ADC circuit is configured to: compare a first voltage representing a quantity of overflow charge stored at the charge storage unit against a first ramping voltage to generate a first decision; and obtain, based on the first decision, a first digital value. In a second mode of measurement, the ADC circuit is configured to: compare a second voltage representing a quantity of residual charge stored in the photodiode against a second ramping voltage to generate a second decision; and obtain, based on the second decision, a second digital value. The ADC circuit is configured to determine, based on one of the first decision or the second decision, whether the photodiode saturates and, based on whether the photodiode saturates, output the first digital value or the second digital value to represent an intensity of incident light.

In some aspects, the second mode of measurement is performed after the first mode of measurement.

In some aspects, the apparatus further comprises: a counter configured to generate count values; a memory; and a register configured to store a flag to indicate whether the photodiode saturates. The ADC circuit is configured to: store, based on the first decision, a first count value from the counter as the first digital value in the memory; and based on whether the flag indicates the photodiode saturates, either maintain the first digital value in the memory or overwrite the first digital value with a second count value from the counter as the second digital value.

In some aspects, the determination of whether the photodiode saturates is based on the first decision. A voltage range of the first ramping voltage is based on a predicted quantity of dark current at a floating drain node, the floating drain node being part of the charge storage unit.

In some aspects, the voltage range of the first ramping voltage is further based on a predicted quantity of noise charge deposited by the dark current within an exposure period, and a charge storage capacity of the charge storage unit.

In some aspects, the ADC circuit is configured to, based on determining that the photodiode saturates in the first mode of measurement: set the flag to a first value to indicate that the photodiode saturates in the first mode of measurement; and keep the first digital value in the memory without overwriting the first digital value with the second digital value in the memory in the second mode of measurement based on the first value of the flag.

In some aspects, the ADC circuit is configured to, based on determining that the photodiode does not saturate in the first mode of measurement: set the flag to a second value to indicate that the photodiode does not saturate in the first mode of measurement; and store the second digital value in the memory in the second mode of measurement based on the second value of the flag.

In some aspects, the determination of whether the photodiode saturates is based on the second decision. The ADC circuit is configured to set the flag to a first value to indicate the photodiode saturates based on the first decision in the first mode of measurement. The ADC circuit is configured to, in the second mode of measurement: determine, based on the second decision, whether the photodiode saturates; and based on the second decision, either set the flag to a second value to indicate the photodiode does not saturate or maintain the flag at the first value.

In some aspects, the ADC circuit is configured to, in the second mode of measurement: store the second digital value in the memory based on the flag being set to the second value, or keep the first digital value in the memory based on the flag being maintained at the first value.

In some aspects, a voltage range of the second ramping voltage is based on a full well capacity of the photodiode.

In some aspects, the voltage range of the second ramping voltage is configured based on a distribution of full well capacities among a plurality of photodiodes that are fabricated using the same process technology as the photodiode.

In some aspects, the voltage range of the second ramping voltage is configured based on a product between a conversion gain and a value representing a first full well capacity, the first full well capacity being lower than a pre-determined percentage of the full well capacities of the plurality of photodiodes based on the distribution.

In some aspects, the percentage is determined based on a pre-determined target likelihood of the voltage range of the second ramping voltage exceeding a full well capacity of the photodiode and based on the distribution.

In some aspects, the target likelihood of the voltage range of the second ramping voltage exceeding the full well capacity of the photodiode is determined based on a tolerated error rate of determining whether the photodiode saturates based on the second decision.

The present disclosure further provides a method for measuring incident light intensity. In one example, the method comprises, in a first mode of measurement: comparing a first voltage representing a quantity of overflow charge from a photodiode and stored in a charge storage unit against a first ramping voltage to generate a first decision; and obtaining, based on the first decision, a first digital value. The method further comprises, in a second mode of measurement: comparing a second voltage representing a quantity of residual charge stored in the photodiode to generate a second decision; and obtaining, based on the second decision, a second digital value. The method further comprises: determining, based on one of the first decision or the second decision, whether the photodiode saturates; and based on whether the photodiode saturates, outputting the first digital value or the second digital value to represent an intensity of incident light.

In some aspects, the second mode of measurement is performed after the first mode of measurement.

In some aspects, the determination of whether the photodiode saturates is based on the first decision. A voltage range of the first ramping voltage is based on a predicted quantity of dark current at a floating drain node which is part of the charge storage unit.

In some aspects, the determination of whether the photodiode saturates is based on the second decision. A voltage range of the second ramping voltage is based on a full well capacity of the photodiode. In some aspects, the voltage range of the second ramping voltage is further configured based on a distribution of full well capacities among a plurality of photodiodes that are fabricated using the same process technology as the photodiode.

BRIEF DESCRIPTION OF THE DRAWINGS

Illustrative embodiments are described with reference to the following figures.

Figure 1A:
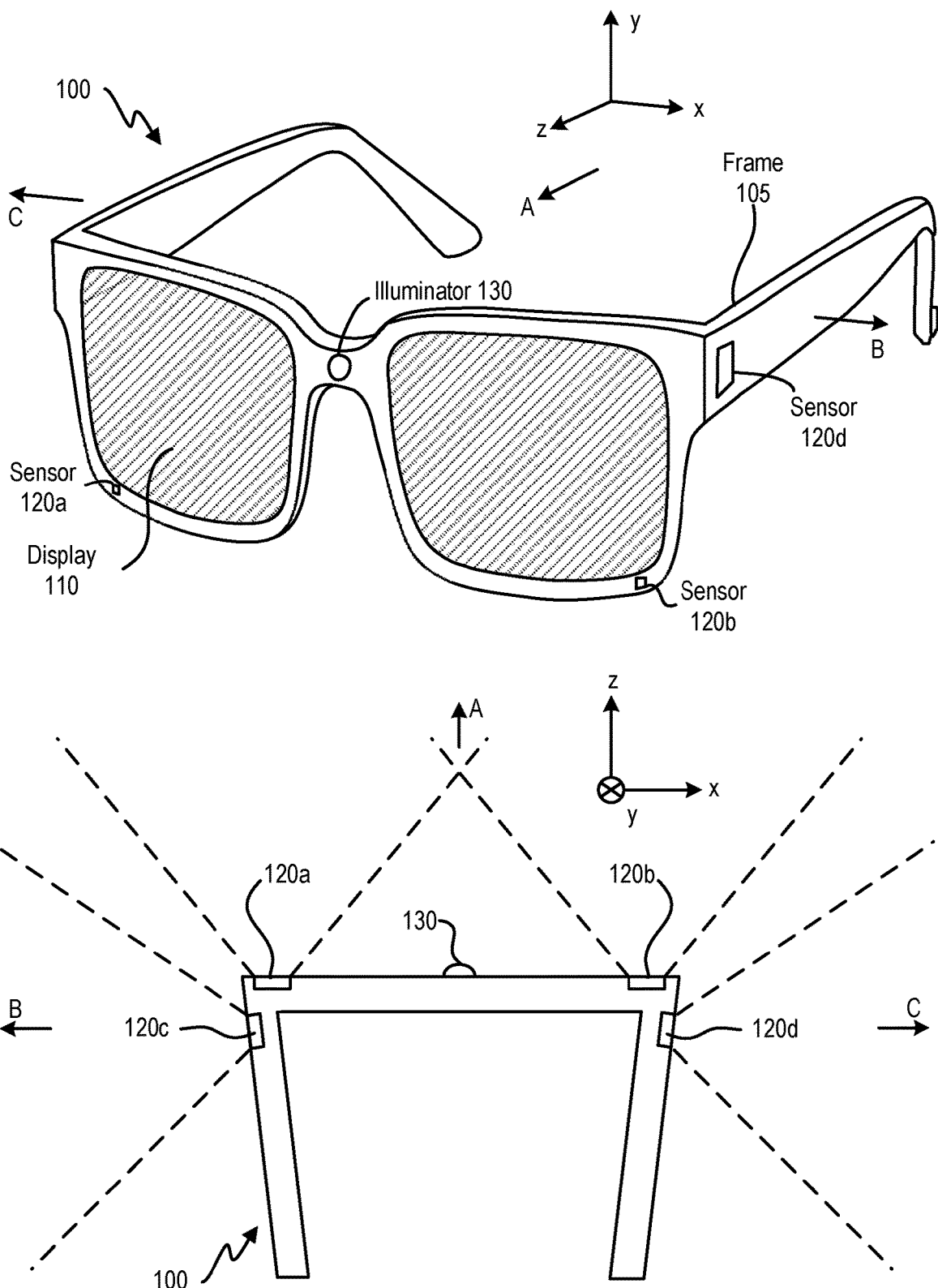
FIGS. 1A and 1B are diagrams of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes a photodiode to sense incident light by converting photons into charge (e.g., electrons or holes). The image sensor further includes a floating node configured as a capacitor to collect the charge generated by the photodiode during an exposure period. The collected charge can develop a voltage at the capacitor. The voltage can be buffered and fed to an analog-to-digital converter (ADC), which can convert the voltage into a digital value representing the intensity of the incident light.

The digital value generated by the ADC, which reflects a number of charges stored at the floating node within a certain period, may correlate to the intensity of the incident light. However, the degree of correlation can be affected by different factors. First, the quantity of charge stored in the floating node can be directly related to the intensity of the incident light until the floating node reaches a saturation limit. Beyond the saturation limit, the floating node may be unable to accept additional charge generated by the photodiode, and the additional charge may be leaked and not stored. As a result, the quantity of the charge stored at the floating node may be lower than the quantity of charge actually generated by the photodiode. The saturation limit may determine an upper limit of the measureable light intensity of the image sensor.

Various factors can also set a lower limit of the measureable light intensity of the image sensor. For example, the charge collected at the floating node may include noise charge not related to the intensity of incident light, as well as dark signal contributed by dark current. Dark current can include leakage currents generated at the p-n junction of the photodiode and at the p-n junctions of other semiconductor devices connected to the capacitor, due to crystallographic defects. The dark currents can flow into the capacitor and add charges which are not correlated to the intensity of the incident light. The dark current generated at the photodiode is typically less than the dark current generated at other semiconductor devices. Another source of noise charge can be capacitive coupling with other circuitries. For example, when the ADC circuitries perform read operations to determine the quantity of charge stored in the floating node, the ADC circuitries can introduce noise charge into the floating node through capacitive coupling.

Besides noise charge, the ADC can also introduce measurement errors in determining the quantity of charge. The measurement errors can degrade the degree of correlation between the digital output and the intensity of the incident light. One source of measurement error is quantization error. In a quantization process, a discrete set of quantity levels can be used to represent a continuous set of quantities of charge, with each quantity level representing a pre-determined quantity of charge. The ADC can compare an input quantity of charge against the quantity levels, determine the quantity level that is closest to the input quantity, and output the determined quantity level (e.g., in the form of digital codes representing the quantity level). Quantization error can occur when there is a mismatch between a quantity of charge represented by the quantity level and the input quantity of charge mapped to the quantity level. The quantization error can be reduced with smaller quantization step sizes (e.g., by reducing the difference in charge quantities between two adjacent quantity levels). Other sources of measurement error may also include, for example, device noises (e.g., of the ADC circuitries) and comparator offsets that add to uncertainties in the measurement of the quantity of charge. The noise charge, dark signal, as well as the ADC measurement errors, can define a lower limit of the measureable light intensity of the image sensor, whereas the saturation limit may determine an upper limit of the measureable light intensity of the image sensor. A ratio between the upper limit and the lower limit defines a dynamic range, which may set a range of operational light intensities for the image sensor.

Image sensors can be found in many different applications. As an example, image sensors are included in digital imaging devices (e.g., digital cameras, smart phones, etc.) to provide digital imaging. As another example, image sensors can be configured as input devices to control or influence the operation of a device, such as controlling or influencing the display content of a near-eye display in wearable virtual-reality (VR) systems and/or augmented-reality (AR) and/or mixed reality (MR) systems. For example, the image sensors can be used to generate physical image data of a physical environment in which a user is located. The physical image data can be provided to a location tracking system operating a simultaneous localization and mapping (SLAM) algorithm to track, for example, a location of the user, an orientation of the user, and/or a path of movement of the user in the physical environment. The image sensors can also be used to generate physical image data including stereo depth information for measuring a distance between the user and an object in the physical environment. The image sensors can also be configured as a near-infrared (NIR) sensor. An illuminator may project a pattern of NIR light into the eyeballs of the user. The internal structures of the eyeballs (e.g., the pupils) may generate a reflective pattern from the NIR light. The image sensors can capture images of the reflective pattern, and provide the images to a system to track the movement of the eyeballs of the user to determine a gaze point of the user. Based on these physical image data, the VR/AR/MR system may generate and update virtual image data for displaying to the user via the near-eye display, to provide an interactive experience to the user. For example, the VR/AR/MR system may update the virtual image data based the user's gazing direction (which may signal the user's interest in the object), a location of the user, etc.

A wearable VR/AR/MR system may operate in environments with a very wide range of light intensities. For example, the wearable VR/AR/MR system may be able to operate in an indoor environment or in an outdoor environment, and/or at different times of the day, and the light intensity of the operation environment of the wearable VR/AR/MR system may vary substantially. Moreover, the wearable VR/AR/MR system may also include the aforementioned NIR eyeball tracking system, which may require projecting lights of very low intensity into the eyeballs of the user to prevent damaging the eyeballs. As a result, the image sensors of the wearable VR/AR/MR system may need to have a wide dynamic range to be able to operate properly (e.g., to generate an output that correlates with the intensity of incident light) across a very wide range of light intensities associated with different operating environments. The image sensors of the wearable VR/AR/MR system may also need to generate images at sufficiently high speed to allow tracking of the user's location, orientation, gaze point, etc. Image sensors with relatively limited dynamic ranges and which generate images at relatively low speed may not be suitable for such a wearable VR/AR/MR system.

This disclosure relates to a pixel cell that can provide extended dynamic range. The pixel cell may include a photodiode, a charge storage unit, a transistor configured as a transfer gate between the photodiode and the charge storage unit, and an analog to digital converter (ADC) circuit. The photodiode can generate charge responsive to incident light and store at least some of the charge until the photodiode saturates. The charge storage unit can be a floating drain of the transistor, a metal capacitor, a Metal-Oxide-Semiconductor (MOS) capacitor, or any combination thereof. The charge storage unit can store overflow charge, which is charge overflowing from the photodiode when the photodiode saturates and cannot store additional charge.

The ADC circuit can operate in multiple modes of measurement. In a first mode of measurement, the ADC circuit can generate a first ramping voltage based on count values from a free running counter and compare the first ramping reference voltage with a first measurement voltage representing a quantity of overflow charge stored in the charge storage unit to generate a first decision output. When the first decision output indicates that the first measurement voltage crosses the first ramping reference voltage, a first count value can be captured from the counter and stored in a memory. In a second mode of measurement, the ADC circuit can generate a second ramping reference voltage based on count values of the counter, and compare the second ramping reference voltage with a second measurement voltage representing a quantity of charge stored in the photodiode to generate a second decision output. When the second decision output indicates that the second measurement voltage crosses the second ramping reference voltage, a second count value can be captured from the counter and stored in the memory. In some embodiments, the ADC can also perform a third mode measurement by comparing the first measurement voltage with a fixed reference voltage representing a saturation limit of the charge storage unit to generate a third decision output while the counter is running and updating the count value. If the third decision output indicates that the first measurement voltage reaches or exceeds the saturation limit, a third count value can be captured from the counter and stored in the memory. The ADC can output one of the first, second, or third count values from the memory to represent the intensity of the incident light.

The different modes of measurements can be targeted for different light intensity ranges. The first mode of measurement can be targeted at a medium light intensity range for which the photodiode is expected to reach full capacity and saturates. The ADC can be operated to measure a quantity of the overflow charge stored in the charge storage unit to determine the light intensity. The second mode of measurement can be targeted at a low light intensity range for which the photodiode is not expected to saturate, and the ADC can measure a quantity of the charge stored in the photodiode by comparing the measurement voltage at the charge storage unit with the ramping reference voltage. Each of the first and second count values can represent the magnitude of the reference voltage that crosses the measurement voltage and can represent the measurement voltage. Moreover, the third mode of measurement can be targeted at a high light intensity range for which the charge storage unit saturates, and the ADC can compare the voltage developed at the charge storage unit with a fixed reference voltage to measure the time required for the charge storage unit to saturate (hereinafter, time-to-saturation, or TTS). The time-to-saturation can be inversely proportional to the rate of accumulation of the charge at the charge storage unit, and the rate can also reflect the intensity of the incident light.

As discussed above, the ADC can select one of the first, second, or third count values from the memory to represent the intensity of the incident light. The selection can be based on one or more of the first, second, and third decision outputs. For example, if the third decision output indicates that the charge storage unit saturates, the third count value can be selected over the first and second count values as the output. If the third decision output indicates that the charge storage unit does not saturate, the third count value can be discarded, and the ADC can select between the first and second count values as the output. If the first decision output or the second decision output indicates that the photodiode saturates, the ADC can select the first count value, which measures the quantity of overflow charge stored in the charge storage unit, as the output. But if the first decision output or the second decision output indicates that the photodiode does not saturate, the ADC can select the second value, which measures the quantity of charge stored in the photodiode, as the output. In some embodiments, the pixel cell may include a set of registers to store at least some of the first, second, and third decisions as flags. The ADC can decide, based on the flag values, whether to store a count value at the memory or to discard the count value (e.g., by not storing the count value, or overwriting the count value in the memory with another count value).

The detection of photodiode saturation, which determines whether the first count or the second count value is output, can be affected by various noise sources such as dark current. For example, the dark current can add dark signal to the floating drain node. The dark signal can lead to generation of an incorrect first decision indicating that the floating drain node stores the overflow charge during the first mode of measurement. The incorrect first decision can cause the ADC to discard the second count value. As a result, the ADC does not output a count value representing the quantity of charge stored in the photodiode, and may instead output an incorrect count value from the memory to represent the incident light intensity.

This disclosure provides several techniques to mitigate the effect of dark current on photodiode saturation detection. In some examples, the first ramping reference voltage can be configured to include a voltage headroom such that the maximum first ramping reference voltage will not cross the voltage of the floating drain if the voltage is caused by the dark current on the floating drain. Such arrangements can reduce the generation of false first decision output in the first mode of measurement caused by the dark current. In some examples, the photodiode saturation detection can be based on the second decision output. As described above, the second decision output can be based on measuring the quantity of charge stored in the photodiode which has been transferred to the floating drain. As the photodiode typically has much lower dark current, the charge transferred from the photodiode to the floating drain is also likely to include fewer noise charges due to dark current. Such an arrangement allows a more accurate photodiode saturation decision that is less susceptible to dark current to be made during the second mode of measurement. In some examples, the second ramping reference voltage can be configured to cover a voltage range that reflects the storage capacity of the photodiode (e.g., full well capacity). The voltage range can also be scaled by a scaling factor to account for potential variations in the storage capacity of the photodiode, to improve the likelihood of correctly detecting photodiode saturation and selecting the first count value as the output.

With the disclosed techniques, the dynamic range of the pixel cell can be extended for both the low light intensity measurement and the high light intensity measurement. For example, the maximum intensity measurable by the pixel cell is no longer limited by the storage capacity of the charge storage unit, as high light intensity can be measured based on time-to-saturation measurement. Moreover, the accuracy of low light intensity measurement can be improved by measuring the charge stored in the photodiode, as well as various techniques to mitigate the effect dark current as described above. The disclosed techniques can also improve the performance of an application (e.g., a VR/AR/MR system) that relies on the digital output of the pixel cell, as well as improve user experience.

The disclosed embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image.

Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
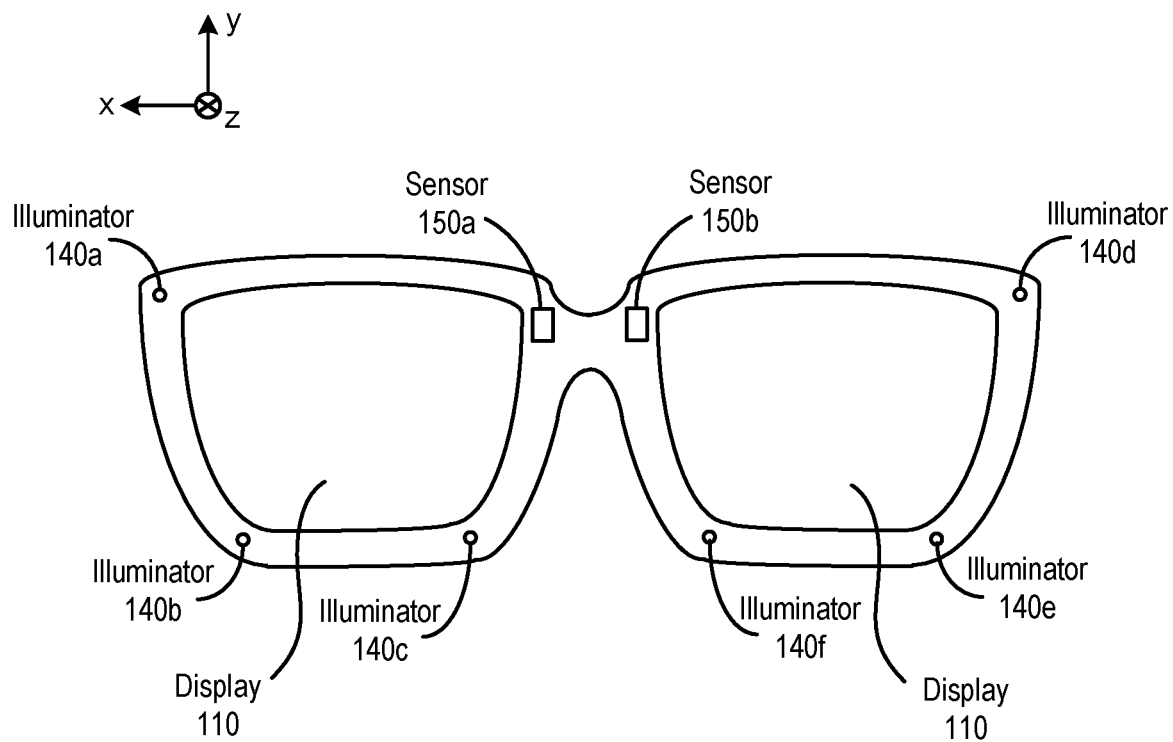

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
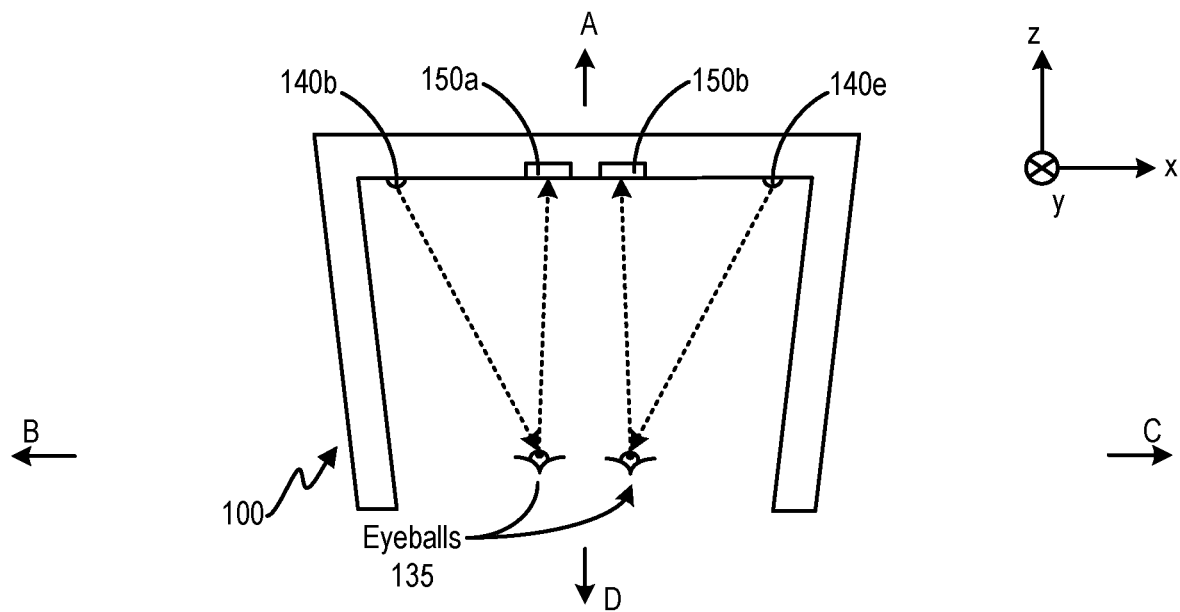
Figure 2:
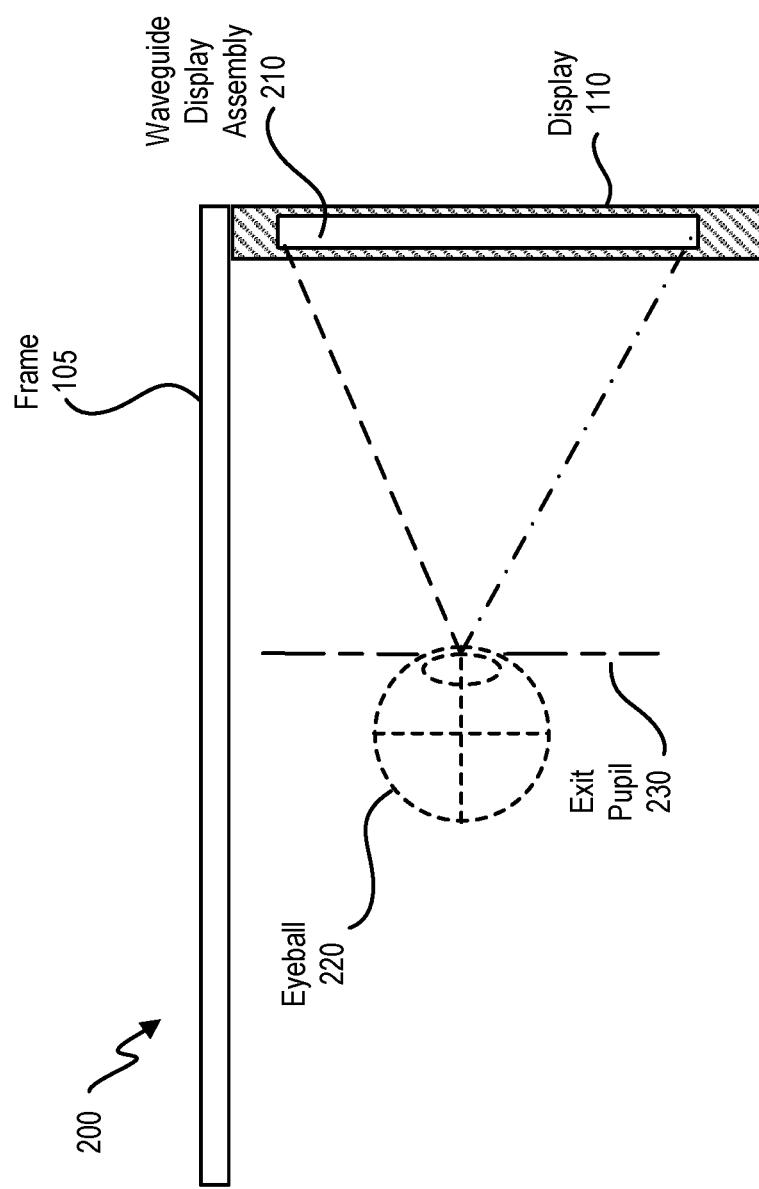
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
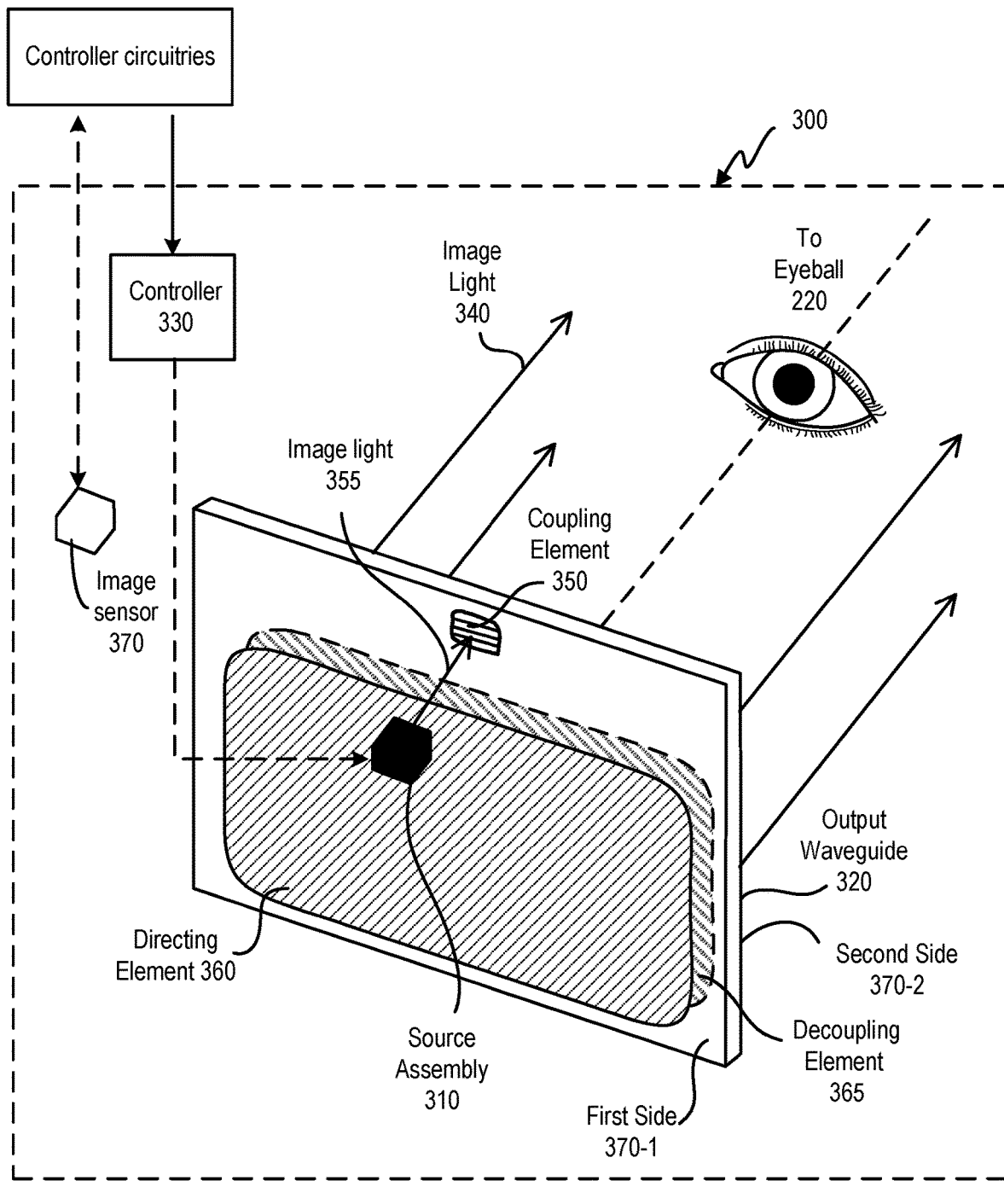
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
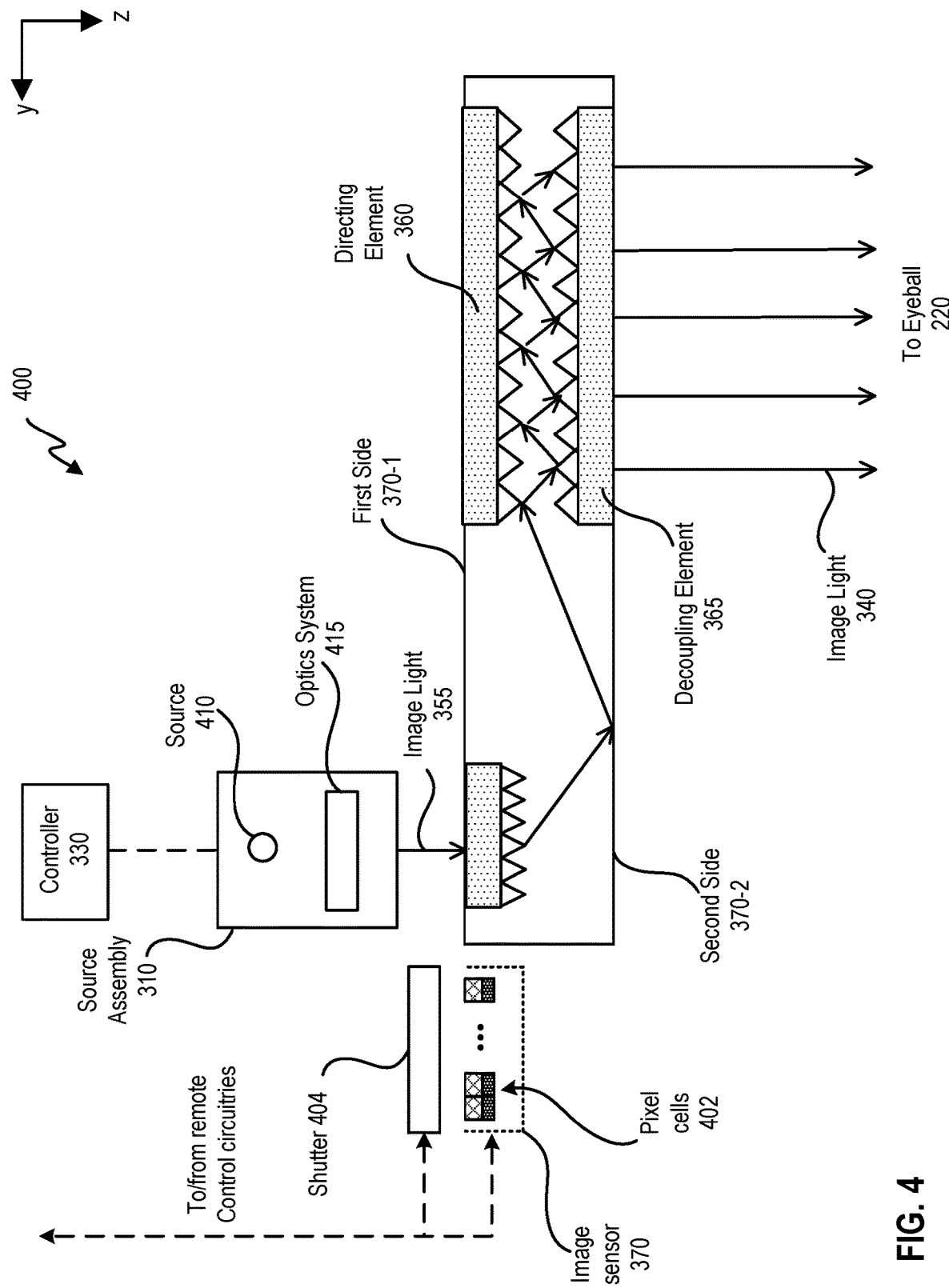
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
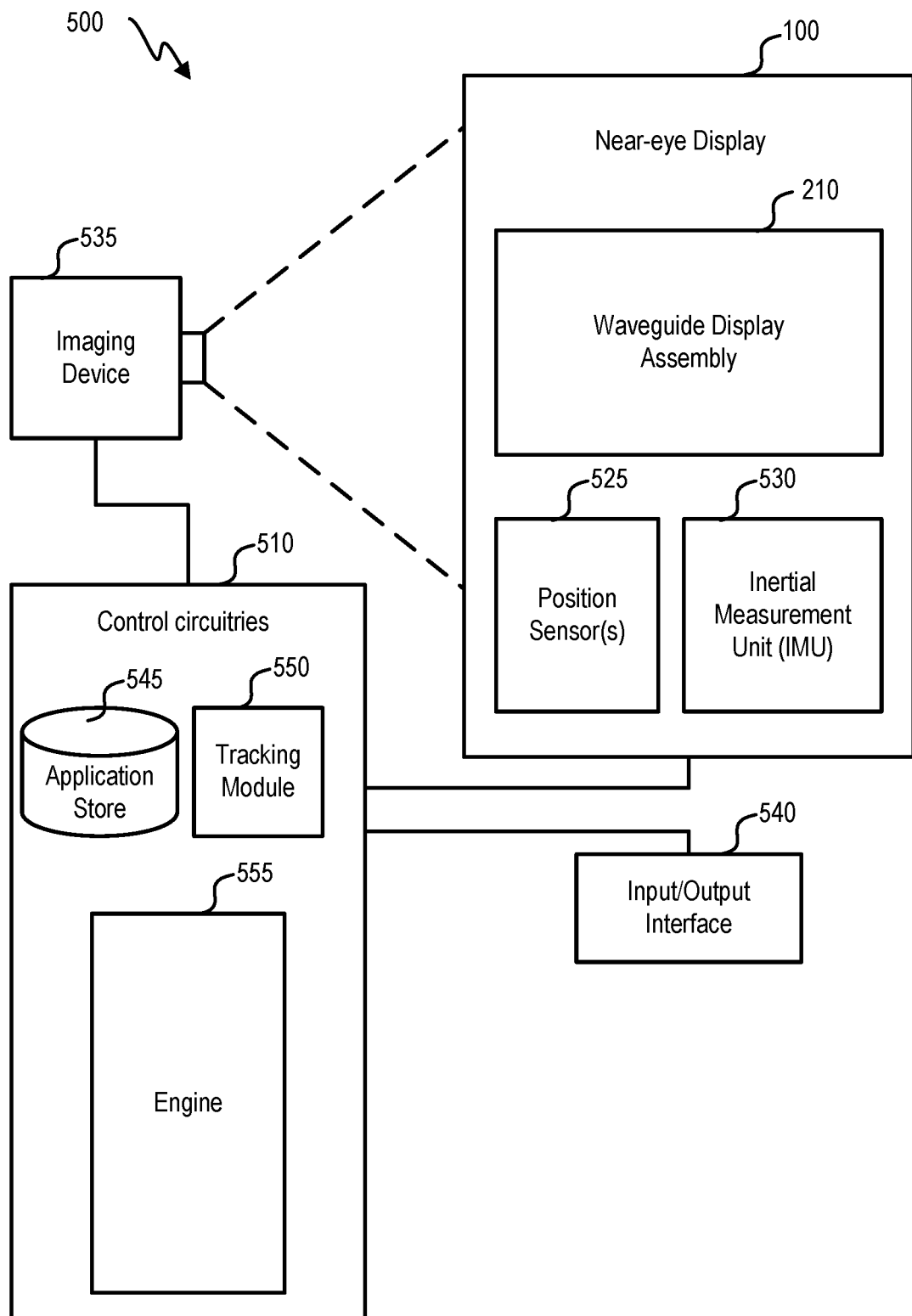
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
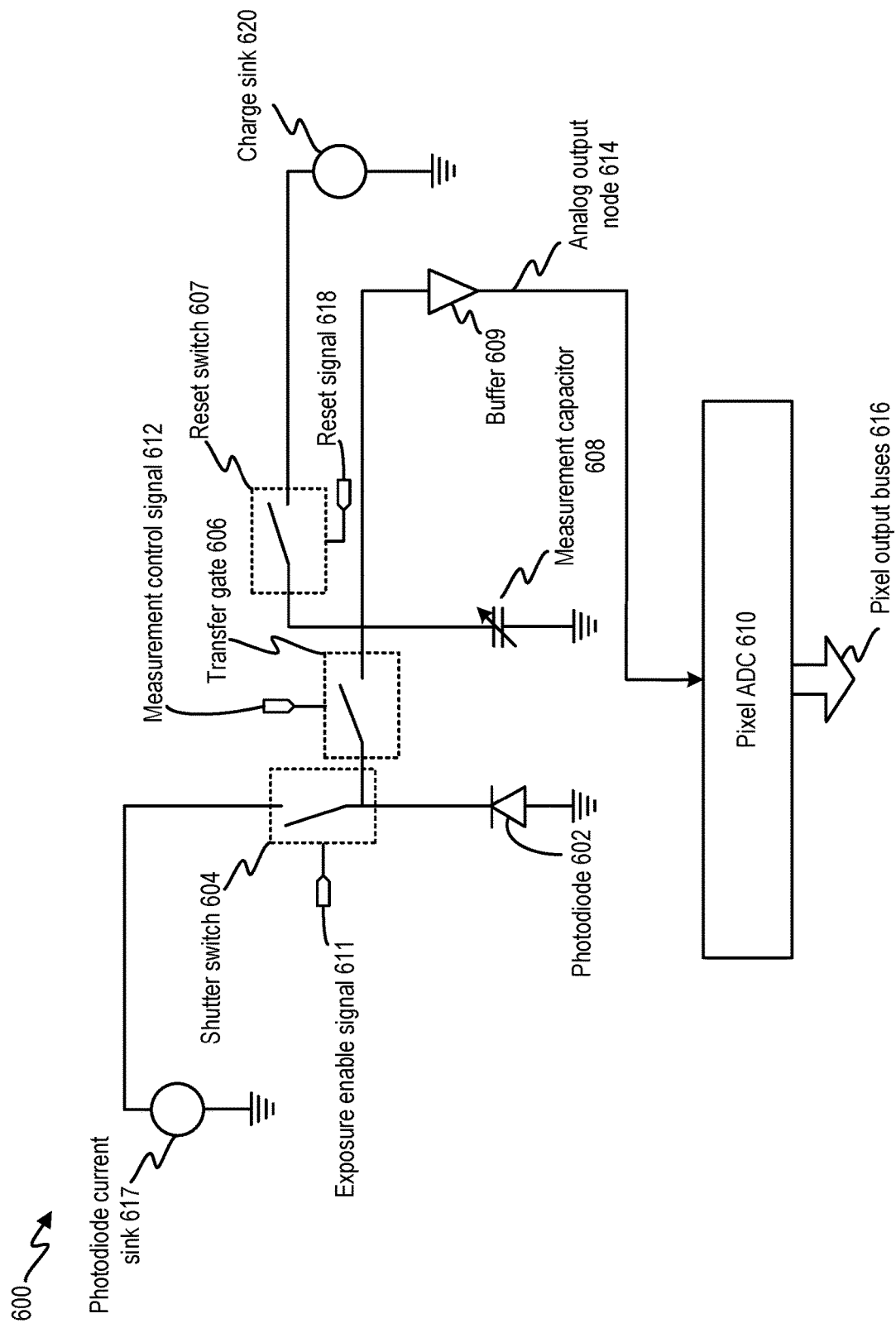
FIG. 6 illustrates block diagrams of embodiments of a pixel cell.

FIG. 6 illustrates an example of a pixel cell 600. Pixel cell 600 may be part of a pixel array and can generate digital intensity data corresponding to a pixel of an image. For example, pixel cell 600 may be part of pixel cells 402 of FIG. 4. As shown in FIG. 6, pixel cell 600 may include a photodiode 602, a shutter switch 604, a transfer gate 606, a reset switch 607, a measurement capacitor 608, a buffer 609, and a pixel ADC 610.

In some embodiments, photodiode 602 may include, for example, a P-N diode, a P-I-N diode, a pinned diode, etc. Photodiode 602 can generate charge upon receiving light, and the quantity of charge generated can be proportional to the intensity of the light. Photodiode 602 can also store some of the generated charge until the photodiode saturates, which occurs when the well capacity of the photodiode is reached. Moreover, each of shutter switch 604, transfer gate 606, and reset switch 607 can include a transistor. The transistor may include, for example, a metal-oxide-semiconductor field-effect transistor (MOSFET), a bipolar junction transistor (BJT), etc. Shutter switch 604 can act as an electronic shutter gate (in lieu of, or in combination with, mechanical shutter 404 of FIG. 4) to control an exposure period of pixel cell 600. During the exposure period, shutter switch 604 can be disabled (turned off) by exposure enable signal 611, which allows photodiode 602 to store the generated charge and, when photodiode 602 saturates, allows the overflow charge to flow to measurement capacitor 608. At the end of the exposure period, shutter switch 604 can be enabled to steer the charge generated by photodiode 602 into photodiode current sink 617. Moreover, reset switch 607 can also be disabled (turned off) by reset signal 618, which allows measurement capacitor 608 to accumulate the charge. Measurement capacitor 608 can be a device capacitor at a floating terminal of transfer gate 606, a metal capacitor, a MOS capacitor, or any combination thereof. Measurement capacitor 608 can be used to store a quantity of charge, which can be measured by pixel ADC 610 to provide a digital output representing the incident light intensity. After a mode of measurement completes, reset switch 607 can be enabled to empty the charge stored at measurement capacitor 608 to charge sink 620, to make measurement capacitor 608 available for the next measurement.

Figure 7:
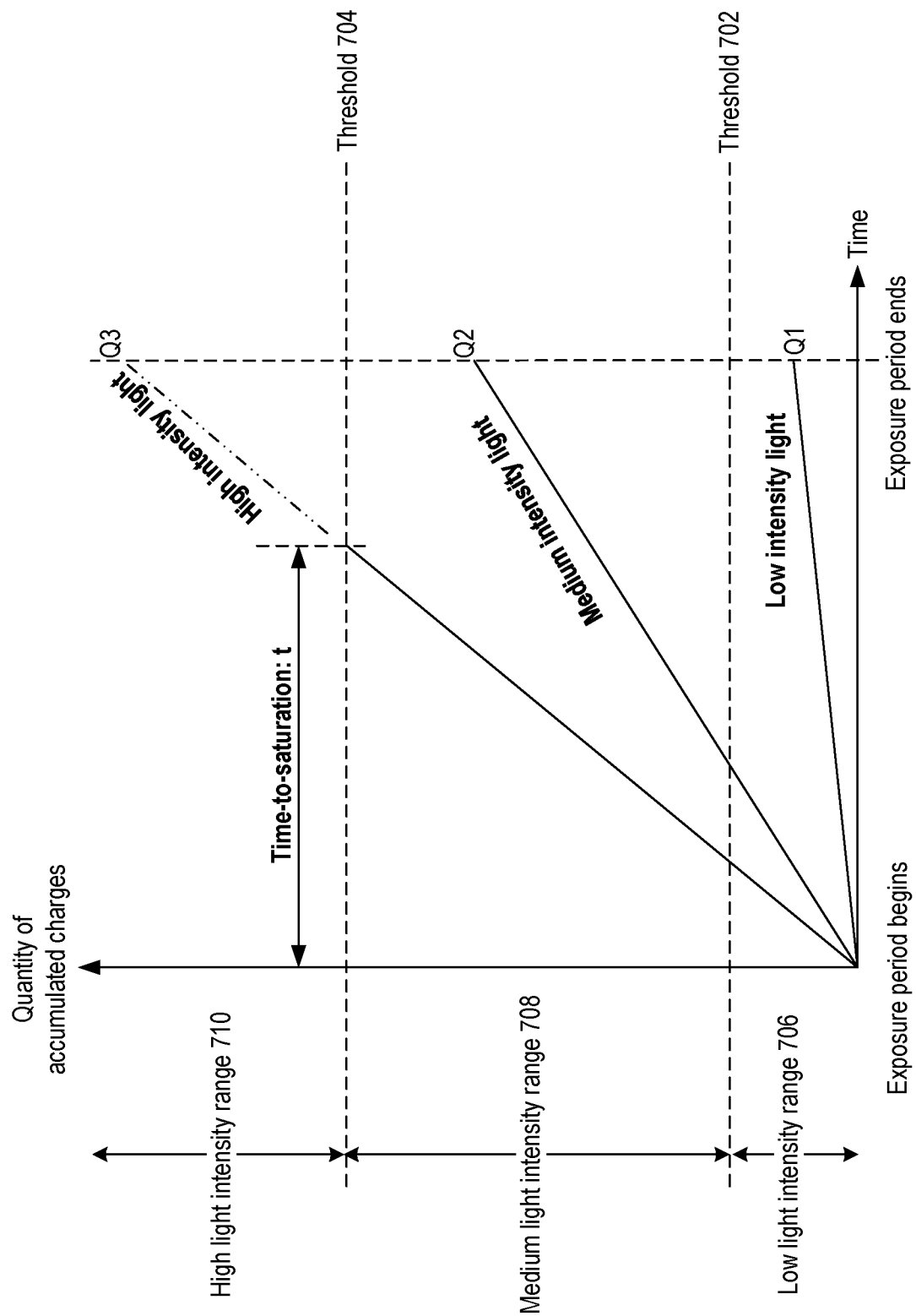
FIG. 7 illustrates operations for determining light intensities of different ranges by embodiments of FIG. 6.

Reference is now made to FIG. 7, which illustrates a quantity of charge accumulated with respect to time for different light intensity ranges. The total quantity of charge accumulated at a particular time point can reflect the intensity of light incident upon photodiode 602 during an exposure period. The quantity can be measured when the exposure period ends. A threshold 702 and a threshold 704 can be defined for a threshold's quantity of charge defining a low light intensity range 706, a medium light intensity range 708, and a high light intensity range 710 for the intensity of the incident light. For example, if the total accumulated charge is below threshold 702 (e.g., Q1), the incident light intensity is within low light intensity range 706. If the total accumulated charge is between threshold 704 and threshold 702 (e.g., Q2), the incident light intensity is within medium light intensity range 708. If the total accumulated charge is above threshold 704, the incident light intensity is within medium light intensity range 708. The quantity of the accumulated charge, for low and medium light intensity ranges, can correlate with the intensity of the incident light, if the photodiode does not saturate within the entire low light intensity range 706 and the measurement capacitor does not saturate within the entire medium light intensity range 708.

The definitions of low light intensity range 706 and medium light intensity range 708, as well as thresholds 702 and 704, can be based on the storage capacities of photodiode 602 and measurement capacitor 608. For example, low light intensity range 706 can be defined such that the total quantity of charge stored in photodiode 602, at the end of the exposure period, is below or equal to the storage capacity of the photodiode, and threshold 702 can be based on the storage capacity of photodiode 602. As to be described below, threshold 702 can be set based on a scaled storage capacity of photodiode 602 to account for potential capacity variation of the photodiode. Such arrangements can ensure that, when the quantity of charge stored in photodiode 602 is measured for intensity determination, the photodiode does not saturate, and the measured quantity relates to the incident light intensity. Moreover, medium light intensity range 708 can be defined such that the total quantity of charge stored in measurement capacitor 608, at the end of the exposure period, is below or equal to the storage capacity of the measurement capacitor, and threshold 704 can be based on the storage capacity of measurement capacitor 608. Typically threshold 704 is also set to be based on a scaled storage capacity of measurement capacitor 608 to ensure that when the quantity of charge stored in measurement capacitor 608 is measured for intensity determination, the measurement capacitor does not saturate, and the measured quantity also relates to the incident light intensity. As to be described below, thresholds 702 and 704 can be used to detect whether photodiode 602 and measurement capacitor 608 saturate, which can determine the intensity range of the incident light and the measurement result to be output.

In addition, in a case where the incident light intensity is within high light intensity range 710, the total overflow charge accumulated at measurement capacitor 608 may exceed threshold 704 before the exposure period ends. As additional charge is accumulated, measurement capacitor 608 may reach full capacity before the end of the exposure period, and charge leakage may occur. To avoid measurement error caused due to measurement capacitor 608 reaching full capacity, a time-to-saturation measurement can be performed to measure the time duration it takes for the total overflow charge accumulated at measurement capacitor 608 to reach threshold 704. A rate of charge accumulation at measurement capacitor 608 can be determined based on a ratio between threshold 704 and the time-to-saturation, and a hypothetical quantity of charge (Q3) that could have been accumulated at measurement capacitor 608 at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 710.

Referring back to FIG. 6, transfer gate 606 can be controlled by a measurement control signal 612 to control the charge accumulations at photodiode 602 and measurement capacitor 608 for different light intensity ranges as described above. To measure high light intensity range 710 and medium light intensity range 708, transfer gate 606 can be controlled to operate in a partially turned-on state. For example, the gate voltage of transfer gate 606 can be set based on a voltage developed at photodiode 602 corresponding to the charge storage capacity of the photodiode. With such arrangements, only overflow charge (e.g., charge generated by the photodiode after the photodiode saturates) will transfer through transfer gate 606 to reach measurement capacitor 608, to measure time-to-saturation (for high light intensity range 710) and the quantity of charge stored in measurement capacitor 608 (for medium light intensity range 708). Moreover, to measure low light intensity range 706, transfer gate 606 can be controlled in a fully turned-on state to transfer the charge stored in photodiode 602 to measurement capacitor 608, to measure the quantity of the charge stored in photodiode 602.

The charge accumulated at measurement capacitor 608 can be sensed by buffer 609 to generate a replica of the analog voltage (but with larger driving strength) at analog output node 614. The analog voltage at analog output node 614 can be converted into a set of digital data (e.g., comprising logical ones and zeros) by pixel ADC 610. The analog voltage developed at measurement capacitor 608 can be sampled and digital output can be generated before the end of the exposure period (e.g., for medium light intensity range 708 and high light intensity range 710), or after the exposure period (for low light intensity range 706). The digital data can be transmitted by a set of pixel output buses 616 to, for example, control circuitries 510 of FIG. 5, to represent the light intensity during the exposure period.

In some examples, the capacitance of measurement capacitor 608 can be configurable to improve the accuracy of light intensity determination for a low light intensity range. For example, the capacitance of measurement capacitor 608 can be reduced when measurement capacitor 608 is used to measure the residual charge stored at photodiode 602. The reduction in the capacitance of measurement capacitor 608 can increase the charge-to-voltage conversion ratio at measurement capacitor 608, such that a higher voltage can be developed for a certain quantity of stored charge. The higher charge-to-voltage conversion ratio can reduce the effect of measurement errors (e.g., quantization error, comparator offset, etc.) introduced by pixel ADC 610 on the accuracy of low light intensity determination. The measurement error can set a limit on a minimum voltage difference that can be detected and/or differentiated by pixel ADC 610. By increasing the charge-to-voltage conversion ratio, the quantity of charge corresponding to the minimum voltage difference can be reduced, which in turn reduces the lower limit of a measurable light intensity by pixel cell 600 and extends the dynamic range. On the other hand, for medium light intensity, the capacitance of measurement capacitor 608 can be increased to ensure that the measurement capacitor 608 has sufficient capacity to store a quantity of charge up to, for example, the quantity defined by threshold 704.

Figure 8:
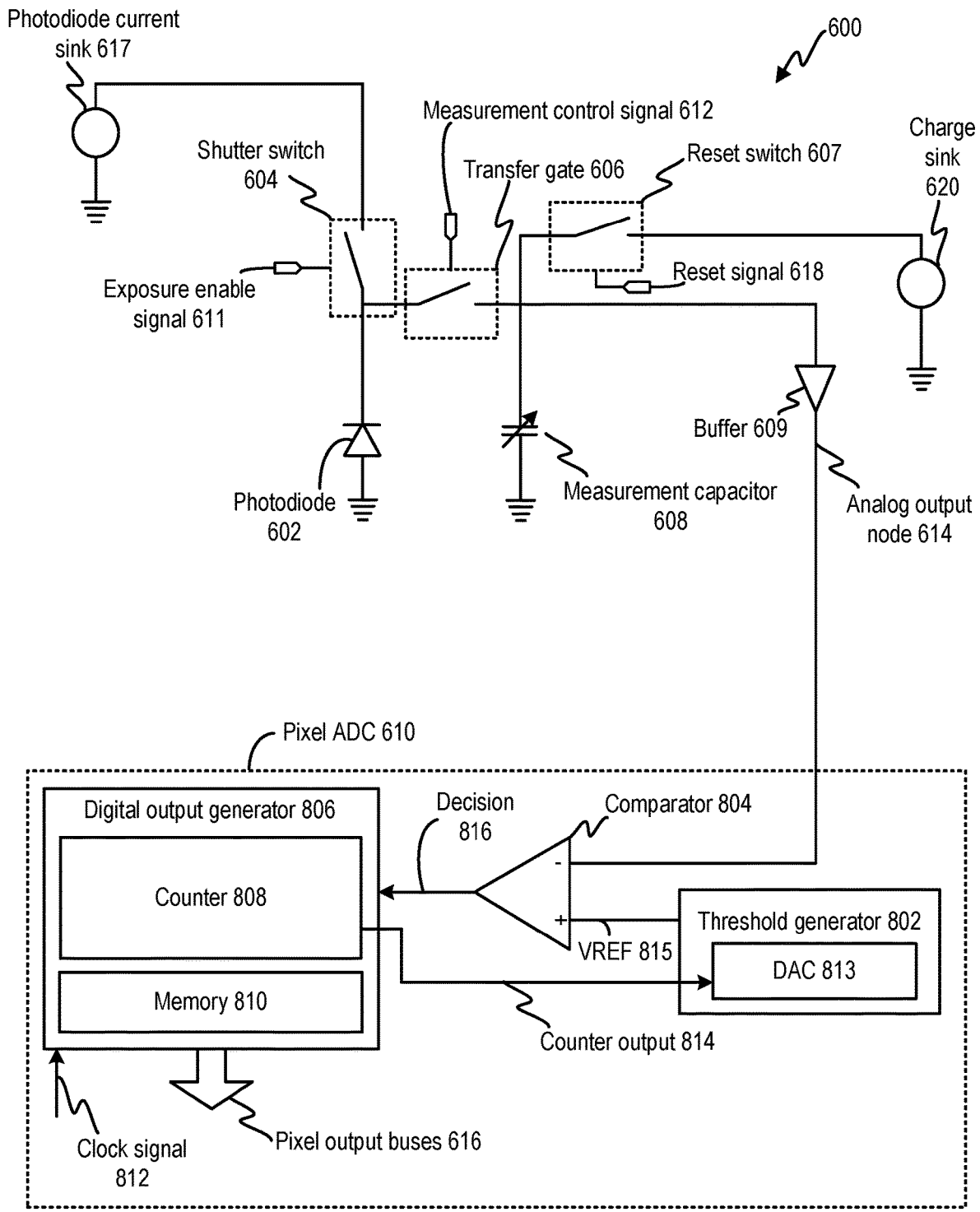
FIG. 8 illustrates examples of internal components of the pixel cell of FIG. 6.

FIG. 8 illustrates an example of the internal components of pixel ADC 610. As shown in FIG. 8, pixel ADC 610 includes a threshold generator 802, a comparator 804, and a digital output generator 806. Digital output generator 806 may further include a counter 808 and a memory device 810. Counter 808 can generate a set of count values based on a free-running clock signal 812, whereas memory 810 can store at least some of the count values (e.g., the latest count value) generated by counter 808. In some embodiments, memory 810 may be part of counter 808. Memory 810 can be, for example, a latch circuit to store the counter value based on local pixel value as described below. Threshold generator 802 includes a digital-to-analog converter (DAC) 813 which can accept a set of digital values and output a reference voltage (VREF) 815 representing the set of digital values. As to be discussed in more detail below, threshold generator 802 may accept static digital values to generate a fixed threshold, or accept output 814 of counter 808 to generate a ramping threshold.

Although FIG. 8 illustrates that DAC 813 (and threshold generator 802) is part of pixel ADC 610, it is understood that DAC 813 (and threshold generator 802) can be coupled with multiple digital output generators 806 from different pixel cells. Moreover, digital output generator 806 can also be shared among a plurality of multiple pixel cells to generate the digital values.

Comparator 804 can compare the analog voltage developed at analog output node 614 against the threshold provided by threshold generator 802, and generate a decision 816 based on the comparison result. For example, comparator 804 can generate a logical one for decision 816 if the analog voltage at analog output node 614 equals or exceeds the threshold generated by threshold generator 802. Comparator 804 can also generate a logical zero for decision 816 if the analog voltage falls below the threshold. Decision 816 can control the counting operations of counter 808 and/or the count values stored in memory 810, to perform the aforementioned time-of-saturation measurement of a ramping analog voltage at analog output node 614 as well as quantization processing of the analog voltage at analog output node 614 for incident light intensity determination.

Figure 9B:
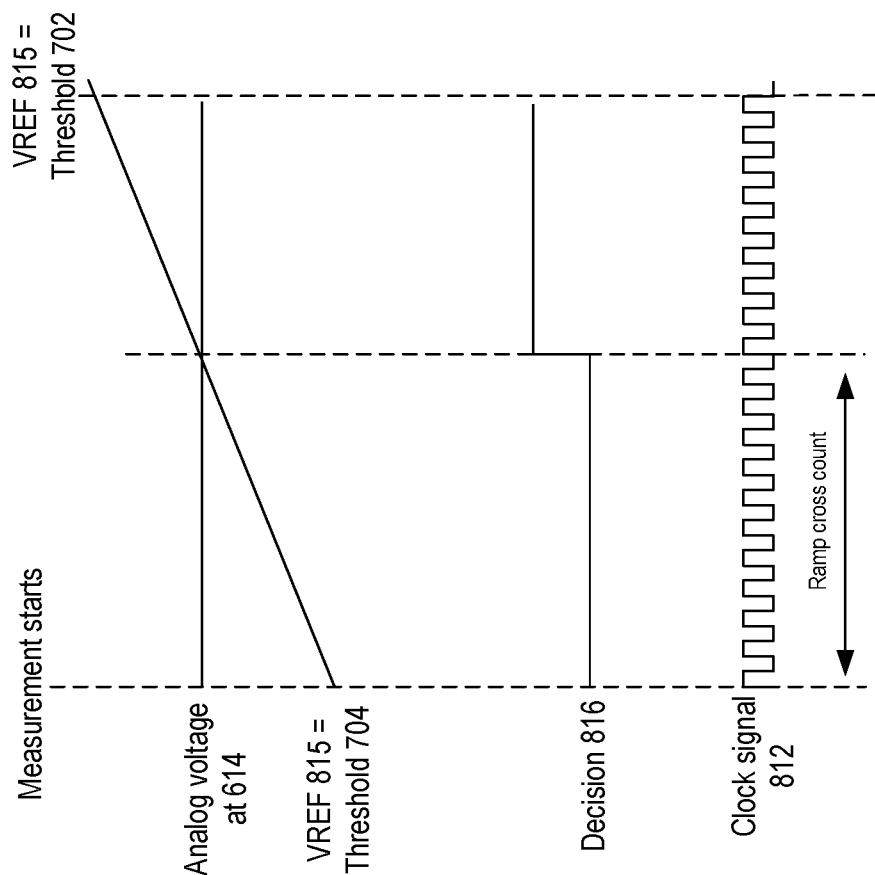
FIGS. 9A and 9B illustrate example methods for determining a light intensity.
Figure 9A:
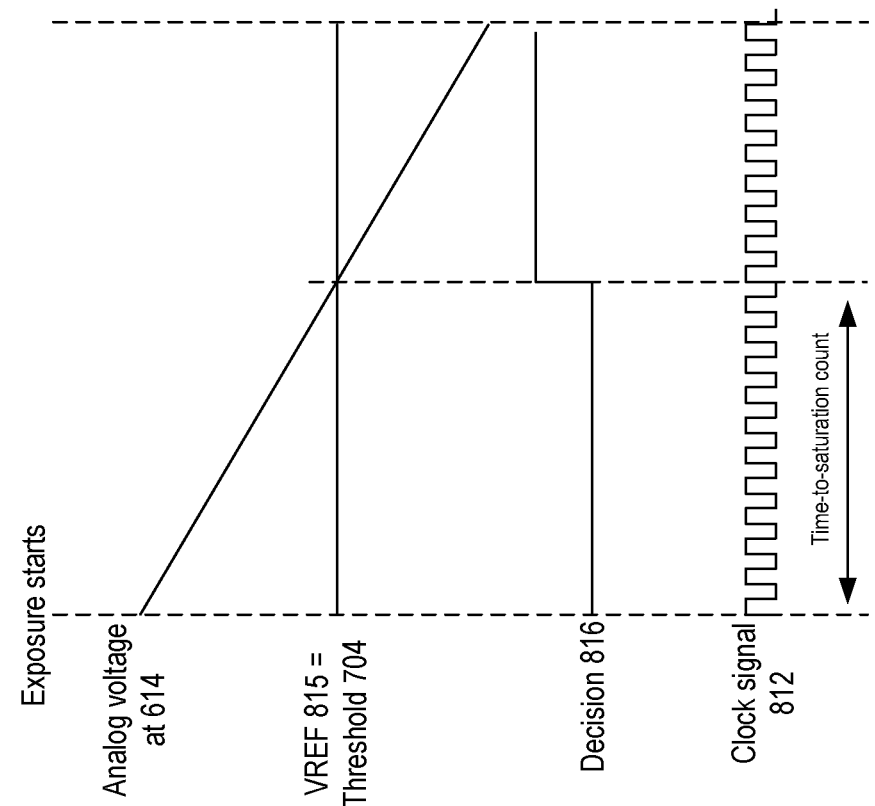

FIG. 9A illustrates an example of time-to-saturation measurement by pixel ADC 610. To perform the time-to-saturation measurement, threshold generator 802 can control DAC 813 to generate a fixed VREF 815. Fixed VREF 815 can be set at a voltage corresponding a charge quantity threshold for saturation of measurement capacitor 608 (e.g., threshold 704 of FIG. 7). Counter 808 can start counting right after the exposure period starts (e.g., right after shutter switch 604 is disabled). As the analog voltage at analog output node 614 ramps down (or up depending on the implementation), clock signal 812 keeps toggling to update the count value at counter 808. The analog voltage may reach the fixed threshold at a certain time point, which causes decision 816 by comparator 804 to flip. The flipping of decision 816 may stop the counting of counter 808, and the count value at counter 808 may represent the time-tosaturation. As to be discussed in more details below, a rate of charge accumulation at measurement capacitor 608 can also be determined based on the duration, and the incident light intensity can be determined based on the rate of charge accumulation.

FIG. 9B illustrates an example of quantizing an analog voltage by pixel ADC 610. After measurement starts, DAC 813 may be programmed by counter output 814 to generate a ramping VREF 815, which can either ramp up (in the example of FIG. 9B) or ramp down depending on implementation. The voltage range of ramping VREF 815 can be between threshold 704 (charge quantity threshold for saturation of measurement capacitor 608) and threshold 702 (charge quantity threshold for saturation of photodiode 602), which can define the medium light intensity range. In the example of FIG. 9B, the quantization process can be performed with uniform quantization steps, with VREF 815 increasing (or decreasing) by the same amount for each clock cycle of clock signal 812. The amount of increase (or decrease) of VREF 815 corresponds to a quantization step. When VREF 815 reaches within one quantization step of the analog voltage at analog output node 614, decision 816 by comparator 804 flips. The flipping of decision 816 may stop the counting of counter 808, and the count value can correspond to a total number of quantization steps accumulated to match, within one quantization step, the analog voltage. The count value can become a digital representation of the quantity of charge stored at measurement capacitor 608, as well as the digital representation of the incident light intensity. As discussed above, the quantization of the analog voltage can occur during the exposure period (e.g., for medium light intensity range 708) and after the exposure period (e.g., for low light intensity range 706).

As discussed above, ADC 610 can introduce quantization errors when there is a mismatch between a quantity of charge represented by the quantity level output by ADC 610 (e.g., represented by the total number of quantization steps) and the actual input quantity of charge that is mapped to the quantity level by ADC 610. The quantization error can be reduced by using a smaller quantization step size. In the example of FIG. 9B, the quantization error can be reduced by the amount of increase (or decrease) in VREF 815 per clock cycle.

Although quantization error can be reduced by using smaller quantization step sizes, area and performance speed may limit how far the quantization step can be reduced. With smaller quantization step size, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps, etc.). The larger number of data bits may require additional buses to be added to pixel output buses 616, which may not be feasible if pixel cell 600 is used on a head-mounted device or other wearable devices with very limited spaces. Moreover, with a larger number of quantization step size, ADC 610 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

Figures 10A, 10B:
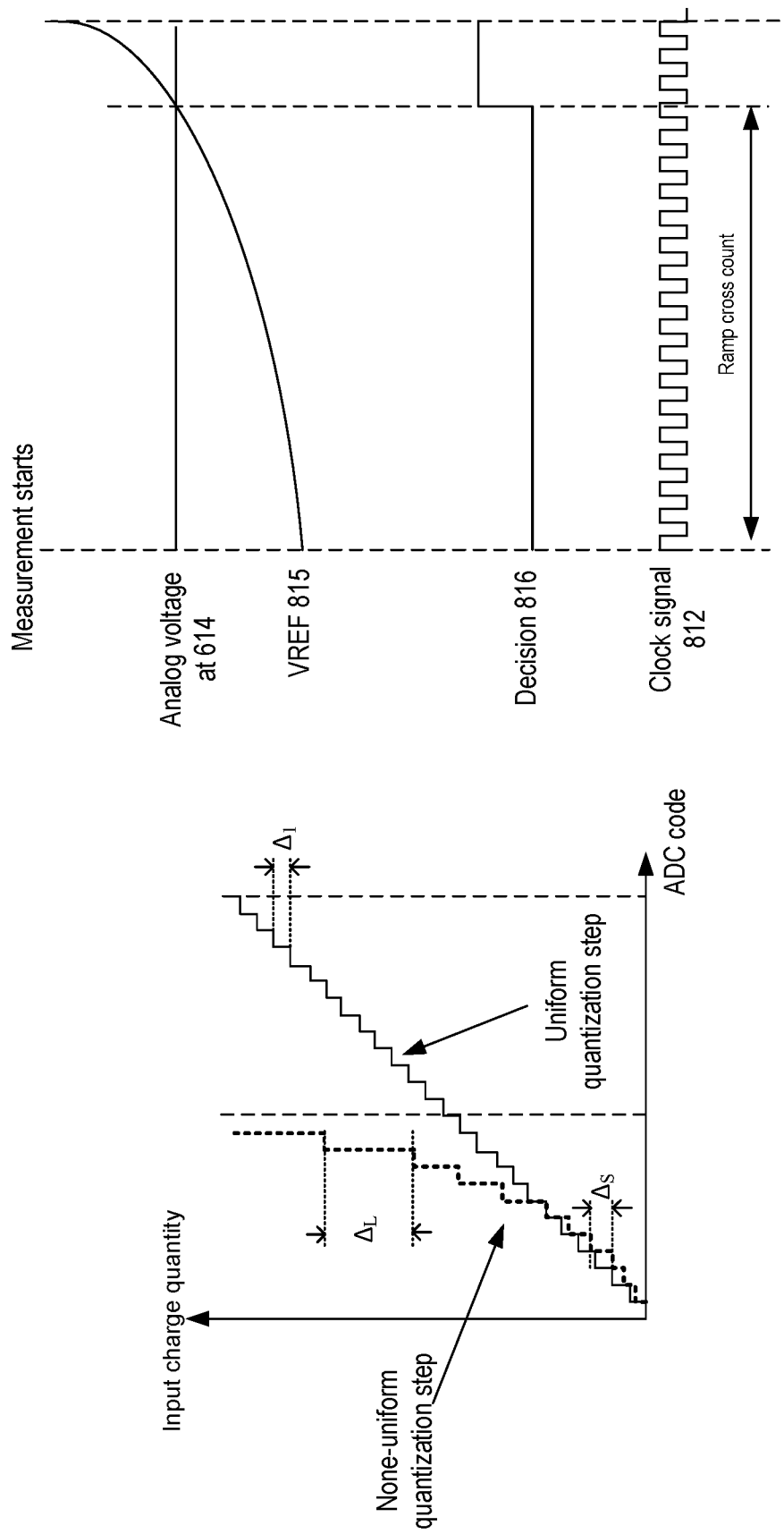
FIGS. 10A and 10B illustrate techniques for performing quantization.

One way to reduce quantization error is by employing a non-uniform quantization scheme, in which the quantization steps are not uniform across the input range. FIG. 10A illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta$s) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 610 can be reduced. Therefore, the reduced quantization errors can push down the lower limit of the measureable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed, etc.) can be avoided.

FIG. 10B illustrates an example of quantizing an analog voltage by pixel ADC 610 using a non-uniform quantization process. Compared with FIG. 9B (which employs a uniform quantization process), VREF 815 increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF 815 increases at a slower rate. For higher counter count values (which correspond to a higher input quantity range), the quantization steps are made larger, hence VREF 815 increases at a higher rate. The uneven quantization steps in VREF 815 can be introduced using different schemes. For example, as discussed above, DAC 813 is configured to output voltages for different counter count values (from counter 808). DAC 813 can be configured such that the difference in the output voltage between two neighboring counter count values (which defines the quantization step size) is different for different counter count values. As another example, counter 808 can also be configured to generate jumps in the counter count values, instead of increasing or decreasing by the same count step, to generate the uneven quantization steps. In some examples, the non-uniform quantization process of FIG. 10B can be employed for light intensity determination for low light intensity range 706 and medium light intensity range 708.

Figure 11:
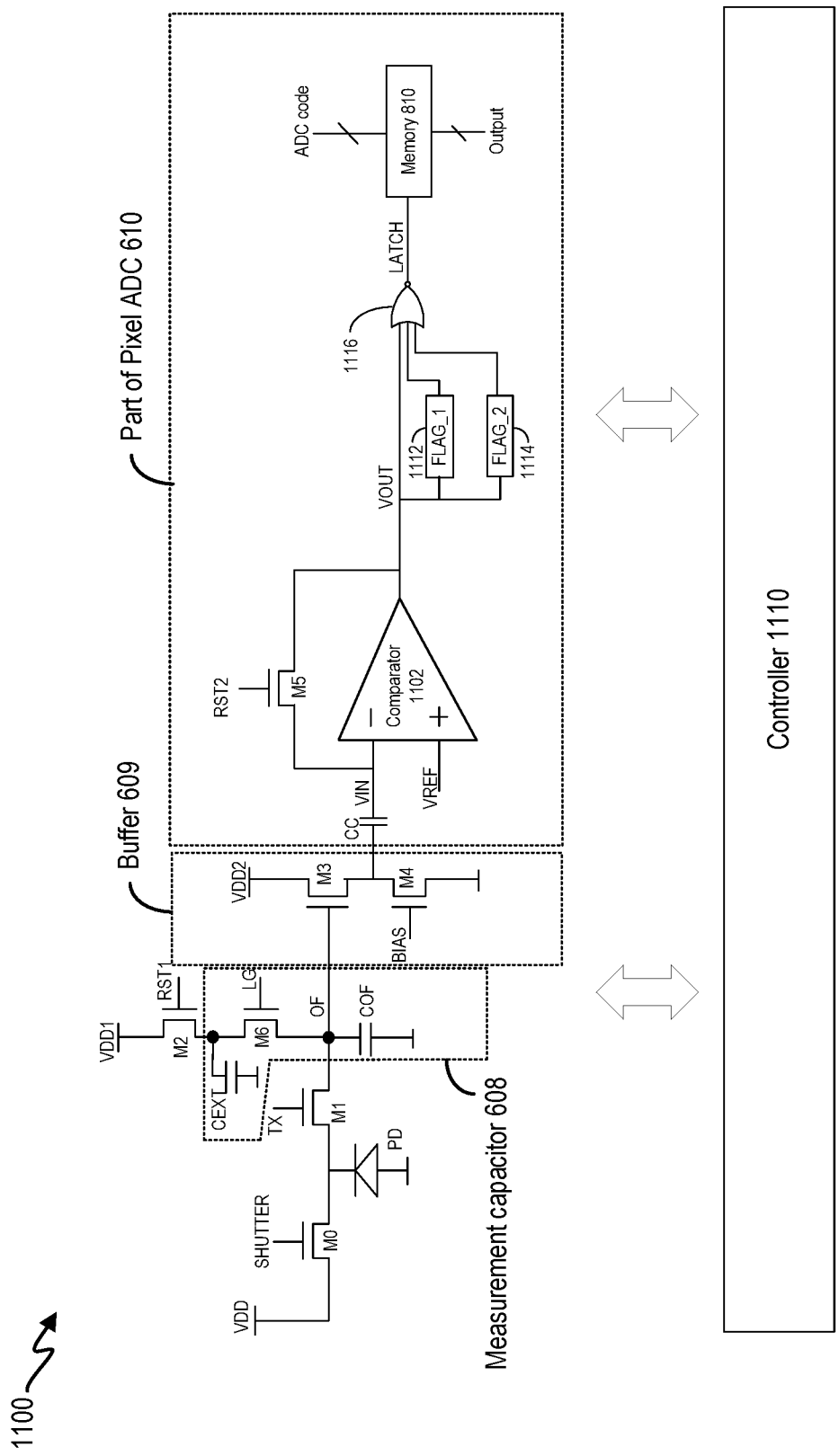
FIG. 11 illustrates block diagrams of an embodiment of a pixel cell.

Reference is now made to FIG. 11, which illustrates an example of pixel cell 1100, which can be an embodiment of pixel cell 600 of FIG. 6. In the example of FIG. 11, PD can correspond to photodiode 602, transistor MO can correspond to shutter switch 604, transistor M1 can correspond to transfer gate 606, whereas transistor M2 can correspond to reset switch 607. Moreover, a combination of COF and CEXT capacitors can correspond to measurement capacitor 608. The capacitance of measurement capacitor 608 is configurable by the signal LG. When LG is enabled, measurement capacitor 608 provides combined capacities of COF and CEXT capacitors. When LG is disabled, CEXT capacitor can be disconnected from the parallel combination, and measurement capacitor 608 comprises only a COF capacitor (plus other parasitic capacitances). As discussed above, the capacitance of measurement capacitor 608 can be reduced to increase the charge-to-voltage conversion ratio for the low light intensity determination, and can be increased to provide the requisite capacity for the medium light intensity determination.

Pixel cell 1100 further includes an example of buffer 609 and an example of pixel ADC 610. For example, transistors M3 and M4 form a source follower which can be buffer 609 of FIG. 6 to buffer an analog voltage developed at the OF node, which represents a quantity of charge stored at the COF capacitor (or at the COF and CEXT capacitors). Further, the CC cap, comparator 1102, transistor M5, NOR gate 1112, together with memory 810, can be part of pixel ADC 610 to generate a digital output representing the analog voltage at the OF node. As described above, the quantization can be based on a comparison result (VOUT), generated by comparator 1102, between the analog voltage developed at the OF node and VREF. Here, the CC cap is configured to generate a VIN voltage (at one input of comparator 1102) which tracks the output of buffer 609, and provides the VIN voltage to comparator 1102 to compare against VREF. VREF can be a static voltage for time-of-saturation measurement (for high light intensity range) or a ramping voltage for quantization of an analog voltage (for low and medium light intensity ranges). The ADC code can be generated by a free-running counter (e.g., counter 808), and the comparison result generated by comparator 1102 can determine the ADC code to be stored in memory 810 and to be output as the digital representation of the incident light intensity. In some examples, the generation of VREF for low and medium light intensity determination can be based on a non-uniform quantization scheme as discussed in FIG. 10A and FIG. 10B.

Pixel cell 1100 includes techniques that can further improve the accuracy of the incident light intensity determination, in addition to the techniques disclosed above. For example, the combination of the CC cap and transistor M5 can be used to compensate for measurement errors (e.g., comparator offset) introduced by comparator 1102, as well as other error signals that are introduced to comparator 1102, such that the accuracy of comparator 1102 can be improved. The noise signals may include, for example, reset noise charge introduced by reset switch 607, a noise signal at the output of buffer 609 due to source follower threshold mismatches, etc. A quantity of charge reflecting the comparator offset as well as the error signals can be stored at the CC cap during a reset phase, when both transistors M2 and M5 are enabled. A voltage difference can also be developed across the CC cap during the reset phase due to the stored charge. During a measurement phase, the voltage difference across the CC cap remains, and the CC cap can track the output voltage of buffer 609 by subtracting away (or adding) the voltage difference to generate VIN. As a result, the VIN voltage can be compensated for the measurement errors and the error signals, which improves the accuracy of the comparison between VIN and VREF and the ensuing quantization.

In addition, pixel cell 1100 further includes a controller 1110. Controller 1110 can generate a sequence of control signals, such as SHUTTER, TX, RST1, RST2, etc., to operate pixel cell 1100 to perform a three-phase measurement operation corresponding to the three light intensity ranges of FIG. 7 (e.g., low light intensity range 706, medium light intensity range 708, and high light intensity range 710). In each phase, pixel cell 1100 can be operated in a measurement mode targeted for the corresponding light intensity range, and determine whether the incident light intensity falls within the corresponding light intensity range based on the decision output (VOUT) of comparator 1102. Pixel cell 1100 further includes a set of registers to store the decision outputs of some of the phases as FLAG_1 and FLAG_2 signals. Based on the FLAG_1 and FLAG_2 signals, controller 1110 can select the ADC code from one of the three phases to represent the incident light intensity. The selected ADC code can be stored in memory 810, and memory 810 can be locked based on a combination of the FLAG_1 and FLAG_2 signals by NOR gate 1116 to prevent subsequent measurement phases from overwriting the selected ADC code output in memory 810. At the end of the three-phase measurement process, controller 1110 can retrieve the ADC code stored in memory 810 and provide the ADC code as the digital output representing the incident light intensity.

Figure 12:
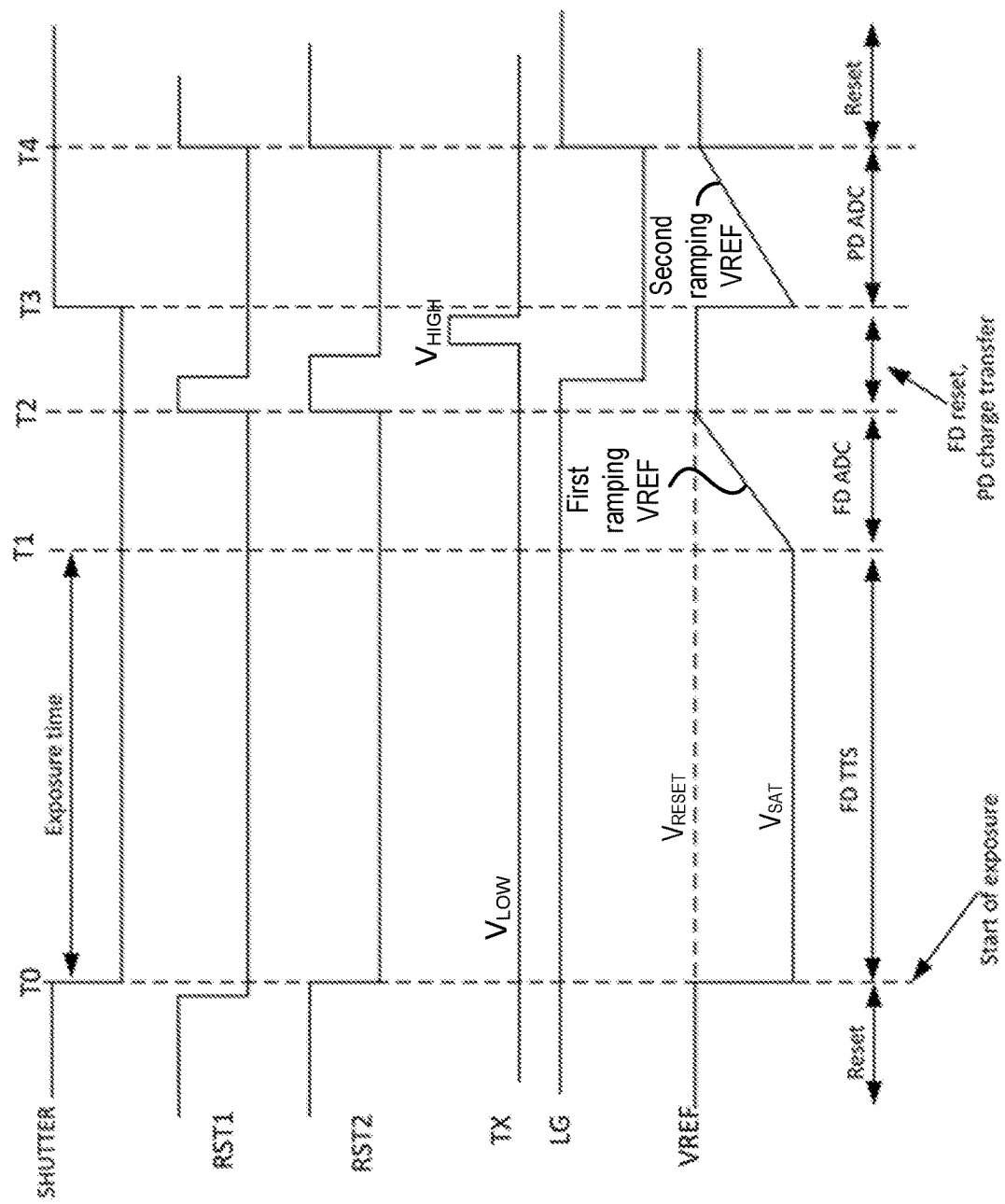
FIG. 12 illustrates an example sequence of control signals to perform light intensity measurement.

Reference is now made to FIG. 12, which illustrates a sequence of the control signals of pixel cell 1100 for the three-phase measurement operation with respect to time. Referring to FIG. 12, the time before T0 corresponds to a first reset phase. The time period between T0 and T1 corresponds to an exposure period and a time-to-saturation measurement mode. The time period between T1 and T2 corresponds to a measurement mode to measure a quantity of overflow charge stored in a floating drain. The measurement mode for measurement of overflow charge is labelled "FD ADC" in FIG. 12 and can be used to measure medium light intensity 708. In addition, the time period between T2 and T3 includes a second reset phase followed by transfer of charge stored in photodiode 602 to the floating drain. Moreover, the time period between T3 and T4 corresponds to a measurement mode to measure a quantity of charge stored in the photodiode and transferred to the floating drain. The measurement mode for measuring the charge stored in the photodiode is labelled "PD ADC" in FIG. 12 and can be used to measure low light intensity 706. Pixel cell 1100 can provide the digital output representing the incident light intensity at time T4, and then start the next three-phase measurement operation.

As shown in FIG. 12, before T0, the RST1 and RST2 signals, the LG signal, and the shutter signal, are asserted, whereas the TX signal is biased at a voltage $V_{LOW}$. $V_{LOW}$ can correspond to the charge capacity of the photodiode PD to allow only overflow charge (if any) to flow from the photodiode PD to the CEXT capacitor and the COF capacitor via transistor M1. With such arrangements, both photodiode PD, as well as the CEXT capacitor and the COF capacitor, can be reset. Moreover, no charge is added to the capacitors because the charge generated by photodiode PD is diverted away by transistor MO. The voltage across the photodiode PD, as well as the OF node, can be set to a voltage equal to $V_{RESET}$, which can represent a state where the photodiode PD, the CEXT capacitor, and the COF capacitor do not store any charge. Further, comparator 1102 is also in a reset phase, and the CC capacitor can store charge reflecting the reset noise introduced by M2, the comparator offset, the threshold mismatch of buffer 609, etc. In addition, the VREF can also be set to a value equal to $V_{RESET}$. In some examples, $V_{RESET}$ can be equal to a supply voltage (e.g., VDD) to pixel cell 1100.

During the time period between T0 and T1, the shutter signal is de-asserted, while the LG signal remains asserted and the TX signal remains at $V_{LOW}$. VREF can be set to a value equal to $V_{SAT}$, which can correspond to a voltage of the OF node when both CEXT and COF capacitors are at capacity. The difference between $V_{SAT}$ and $V_{RESET}$ can correspond to, for example, threshold 704 of FIG. 7. During the time period between T0 and T1, a time-to-saturation (TTS) measurement can be performed, in which overflow charge flows from the photodiode PD to the COF capacitor and the CEXT capacitor via transistor M1 to develop a ramping voltage at OF node. A buffered and error-compensated version of analog voltage at the OF node (VIN) can be compared against $V_{SAT}$ while counter 808 is free-running. If the total charge stored at the COF capacitor and the CEXT capacitor exceeds threshold 704 (based on the OF node voltage), comparator 1102 will trip, and the count value generated by counter 808 at the time of flipping can be stored into memory 810. The flipping of comparator 1102 also causes controller 1110 to store a value of 1 for FLAG_1 signal in register 1112. The non-zero FLAG_1 signal value can cause the output of NOR gate 1116 to remain low regardless of other inputs to the NOR gate, and can lock the memory and prevent subsequent measurement phases from overwriting the count value. On the other hand, if comparator 1102 never flips during the time period between T1 and T2, which indicates that the incident light intensity is below the high light intensity range, the FLAG_1 signal stays zero. Controller 1110 does not update the FLAG_2 value stored in register 1114 between time period T0-T1, and the FLAG_2 value can remain zero.

During the time period between T1 and T2, which corresponds to the second phase of measurement, the analog voltage at the OF node can be quantized by ADC 610, to measure the quantity of overflow charge stored in the CEXT capacitor and the COF capacitor (labelled "FD ADC"). In some examples, during the time period T1-T2, photodiode PD can be shielded from incident light (e.g., by mechanical shutter 404), so that the total overflow charge stored in the CEXT capacitor and the COF capacitor, and the analog voltage at the OF node, remain constant. A first ramping VREF can be supplied to comparator 1102 to be compared against the buffered and error-compensated version of analog voltage at the OF node (VIN). The first ramping VREF can be generated by a DAC based on count values from the free running counter. If the ramping VREF matches the VIN (within one quantization step), comparator 1102 will trip, and the count value generated by counter 808 at the time of flipping can be stored into memory 810, if the memory is not locked by the first phase of measurement (as indicated by the zero value of FLAG_1 signal). If the memory is locked, the count value will not be stored into memory 810.

In one example, as shown in FIG. 12, the voltage range of the ramping VREF can be between $V_{SAT}$ and $V_{RESET}$. $V_{SAT}$ can define the upper limit of the total overflow charge stored in the CEXT capacitor and the COF capacitor (when they are close to saturated), whereas $V_{RESET}$ can define the lower limit of the total overflow charge stored in the capacitors (when there is no overflow charge, hence the voltage of the OF node remains at $V_{RESET}$). As to be described in details below, the maximum voltage of the first ramping VREF can be lowered to become lower than $V_{RESET}$ to provide a headroom/margin to account for the effect of dark current. Such arrangements can improve the likelihood that the flipping of comparator 1102 during the FD ADC phase correctly indicates that photodiode PD saturates.

In some examples, as to be described below, controller 1110 can assert the FLAG_2 signal in register 1114 based on the flipping of comparator 1102 in the FD ADC phase to lock the count value stored in memory 810, which prevents the subsequent phase from storing another count value in memory 810. In some examples, as to be described below, the controller 1110 can also not use the flipping of comparator 1102 during the FD ADC phase. The controller 1110 can allow the subsequent phase to detect whether the photodiode PD saturates, and can overwrite the count value in the memory with a new count value obtained in the subsequent phase, if FLAG_1 signal is not asserted. Such arrangements can reduce the risk of false detection of photodiode saturation caused by dark current at the OF node during the FD ADC phase.

At the beginning of the time period between T2 and T3, both RST1 and RST2 signals can be asserted again for a second reset phase. The purpose of the second reset phase is to reset the CEXT and COF capacitors, and to prepare the COF capacitor for storing charge transferred from the PDCAP capacitor in the third phase of measurement (for low light intensity range). The LG signal can also be de-asserted to disconnect the CEXT capacitor from the COF capacitor and to reduce the capacitance of the measurement capacitor. The reduction of the capacitance is to increase the charge-to-voltage conversion ratio to improve the low light intensity determination, as discussed above. Comparator 1102 is also put into the reset state where the CC cap can be used to store the noise charge generated by the resetting of the CEXT and COF capacitors. Towards time T3, after the resetting completes, the RST1 and RST2 signals are de-asserted, whereas the bias TX can increase to $V_{HIGH}$ to fully turn on transistor M1. The charge stored in the photodiode PD can then move into the COF capacitor via M1.

During the time period between T3 and T4, the third phase of measurement can be performed to measure the charge stored in the photodiode (labelled "PD ADC" phase) for the low light intensity range. During that period, the shutter signal is asserted, whereas the TX signal is de-asserted (e.g., setting to zero) or set back to $V_{LOW}$ to prevent charge stored at the COF capacitor from leaking via M1. A second ramping VREF can be supplied to comparator 1102 to be compared against the buffered and error-compensated version of analog voltage at the OF node (VIN). If the second ramping VREF matches the VIN (within one quantization step), comparator 1102 will trip, and the count value generated by counter 808 at the time of flipping can be stored into memory 810, if the memory is not locked by the first phase of measurement (as indicated by the zero values of FLAG_1 signal).

In the example shown in FIG. 12, the second ramping VREF can have the same voltage range as the first ramping VREF as between $V_{SAT}$ and $V_{RESET}$. In some other examples, photodiode saturation detection can be performed during the PD ADC phase, and the maximum voltage of the second ramping VREF can be set at a value to reflect the charge storage capacity of the photodiode PD. The flipping of comparator 1102 during the PD ADC phase can indicate the charge stored in the photodiode PD is below the charge storage capacity, and the photodiode PD does not saturate.

Based on such determination, the count value obtained in the PD ADC phase can be stored into memory 810 if the memory is not locked by the first phase of measurement.

Although FIG. 12 shows a three-phase measurement operation to measure incident light intensity, it is understood that one or more of the phases be skipped based on, for example, an expected incident light intensity range for an operation environment. For example, if the pixel cell operates in an environment with low ambient light (e.g., in the night time), the first phase of measurement, which is targeted at high light intensity, can be skipped. Moreover, if the pixel cell operates in an environment with medium or strong ambient light (e.g., in the day time), the third phase of measurement, which is targeted at low light intensity, can be skipped.

Figure 13A:
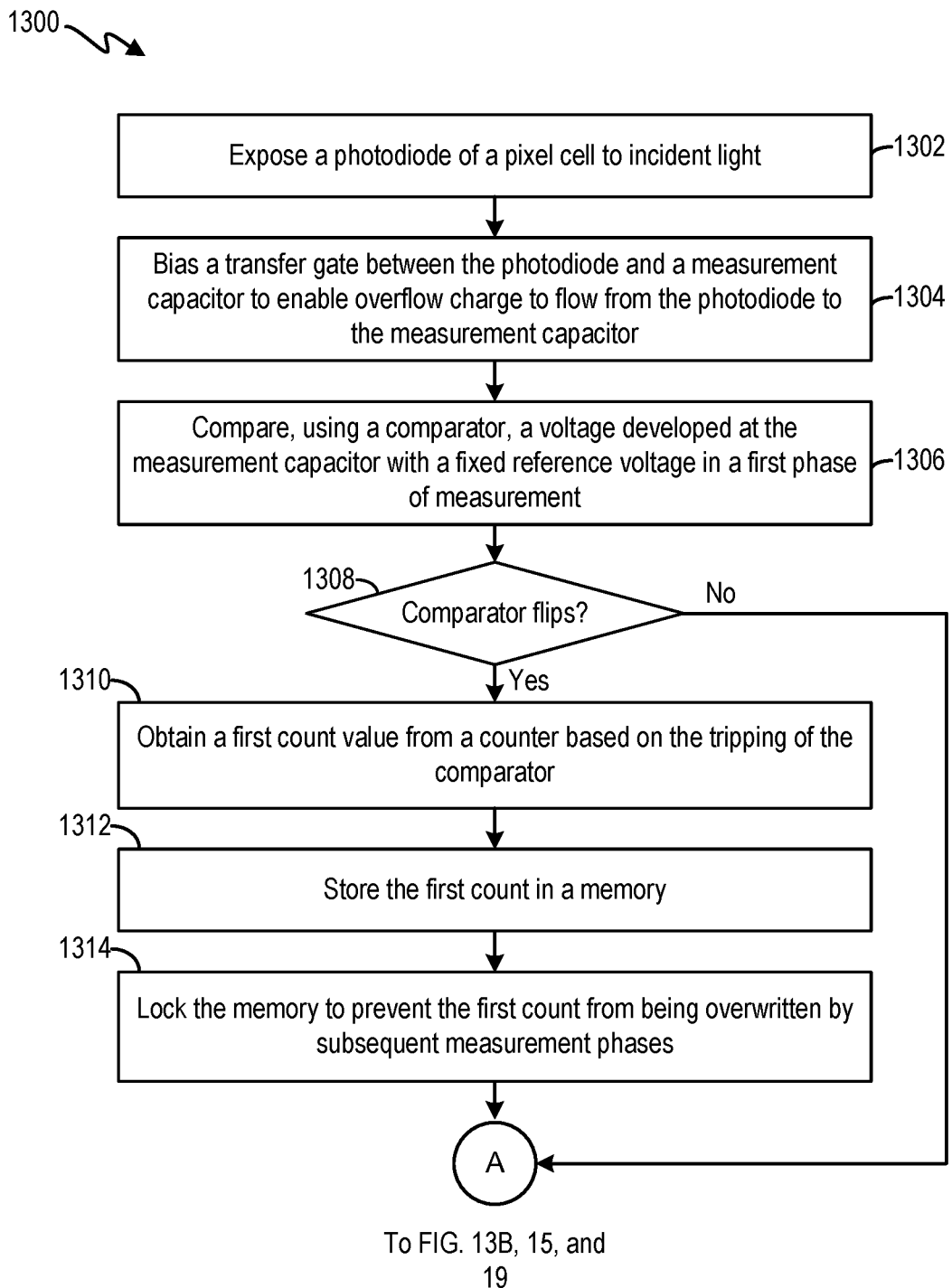
FIGS. 13A and 13B illustrate a flowchart of an example process for measuring light intensity.
Figure 13B:
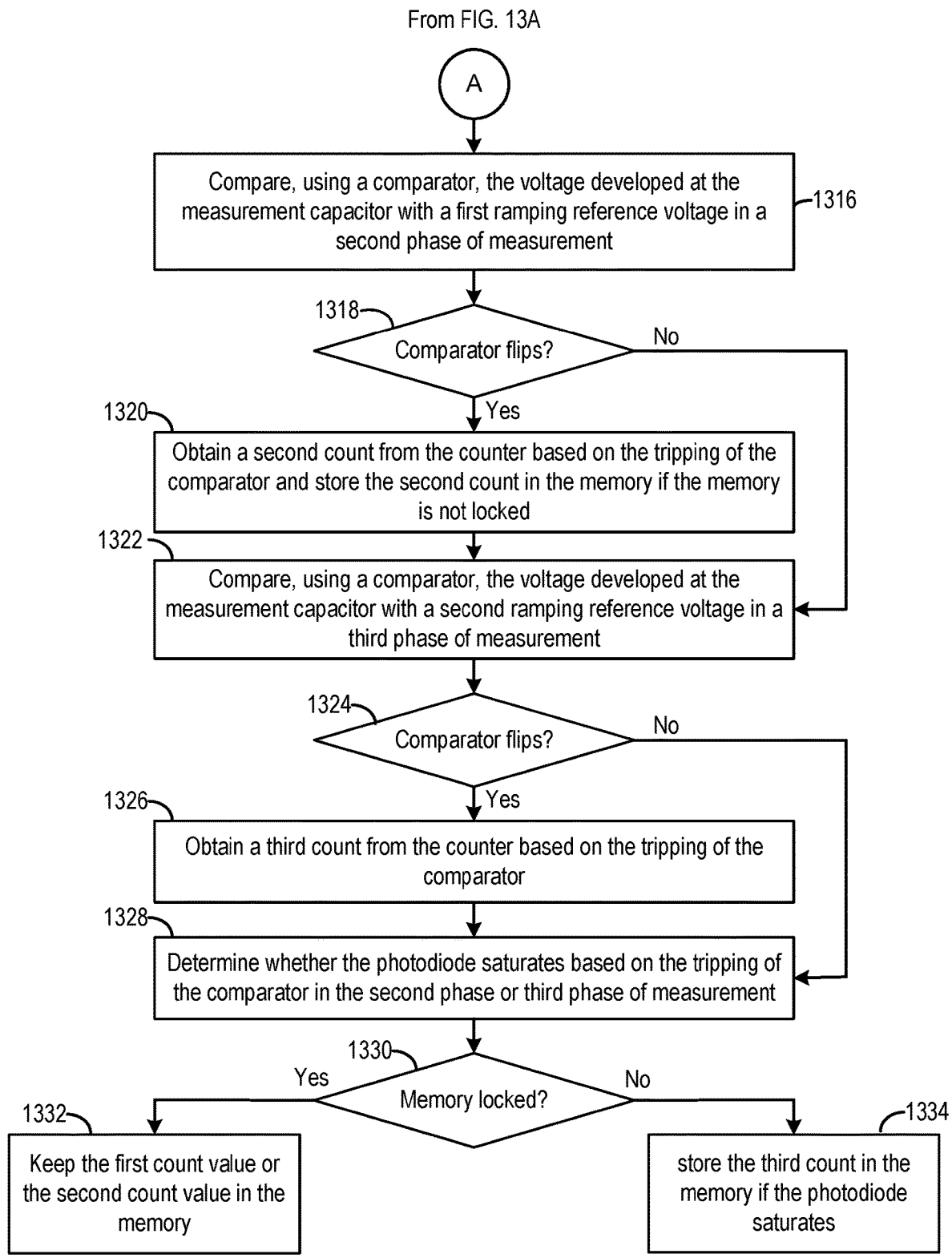

FIG. 13A and FIG. 13B illustrate an embodiment of a flowchart of a process 1300 for determining incident light intensity at a pixel cell (e.g., pixel cell 600, pixel cell 1100, etc.). Process 1300 can be performed by, for example, controller 1110 together with various components of the pixel cell. Referring to FIG. 13A, process 1300 begins in step 1302, in which the photodiode of the pixel cell (e.g., photodiode PD) is exposed to incident light and allowed to generate and store charge responsive to the incident light. Step 1302 can be performed based on de-asserting the shutter signal and the reset signals (e.g., RST_1, RST_2).

In step 1304, a transfer gate between the photodiode and a measurement capacitor (e.g., CEXT and COF) can be biased to enable overflow charge to flow from the photodiode to the measurement capacitor to develop a voltage. The bias voltage can be set based on, for example, a voltage of the photodiode when the photodiode saturates.

In step 1306, in a first phase of measurement, a comparator (e.g., comparator 1102) can compare a voltage of the measurement capacitor with a fixed reference voltage. The first phase of measurement can correspond to time-to-saturation (TTS) measurement between times T0 and T1 of FIG. 12. The fixed reference voltage can be based on a voltage of the measurement capacitor when the measurement capacitor is close to saturation. A free running counter also updates its count value during the first phase of measurement. The first phase of measurement can be for measuring a high light intensity range.

Figure 14:
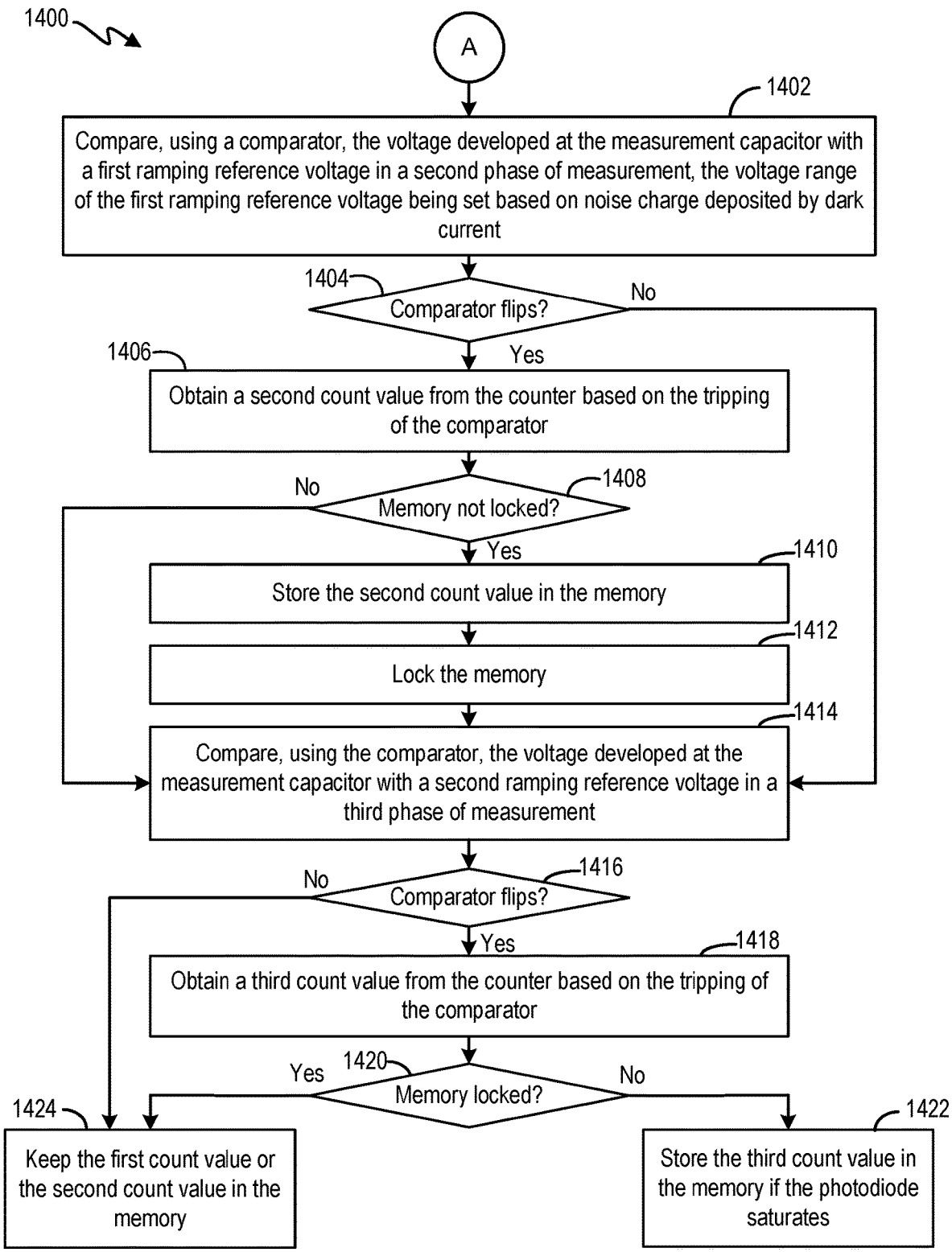
FIG. 14 illustrates a flowchart of another example process for measuring light intensity.
Figure 16:
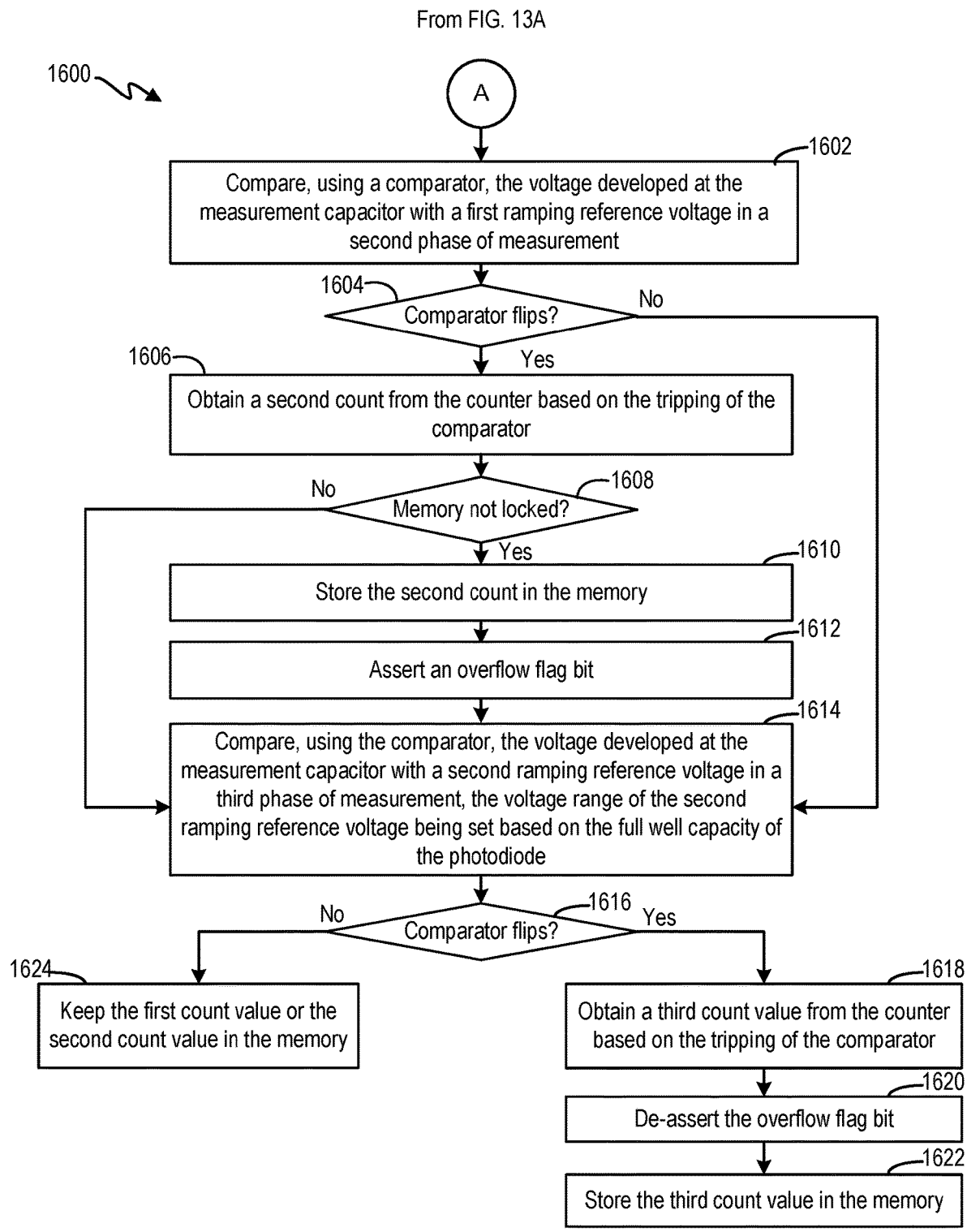
FIG. 16 illustrates a flowchart of another example process for measuring light intensity.

In step 1308, as part of the first phase of measurement, the controller determines whether the comparator flips. If the comparator flips, which indicates that total overflow charge stored at the measurement capacitor is close to the storage capacity, the controller can proceed to step 1310 to obtain a first count value from the counter based on the flipping of the comparator, and store the first count value in a memory, in step 1312. The controller can lock the memory to prevent the first count value from being overwritten by subsequent measurement phases, in step 1314. The controller can then proceed to the subsequent measurement phases as shown in FIG. 13B, FIG. 14, and FIG. 16 for measuring a medium light intensity range and/or a low light intensity range. If the comparator does not flip in step 1308, the controller can also proceed to the subsequent measurement phases.

In some examples, as shown in FIG. 11, the memory can include a latch circuit, and the pixel cell can include NOR gate 1116 to assert a latch signal that enables the memory to update the stored count value with the latest count value of the free running counter. As part of steps 1310, 1312, and 1314, based on the flipping of the comparator, the controller can assert FLAG _1 signal, which can cause NOR gate 1116 to de-assert the latch signal to stop the memory from further updating the stored count value. The assertion of the FLAG_1 signal can also keep the latch signal de-asserted and lock the memory.

Referring to FIG. 13B, the controller can then proceed to step 1316 to perform a second phase of measurement. The second phase of measurement can be configured to measure a quantity of the overflow charge accumulated at the measurement capacitor after the photodiode saturates, and can correspond to the FD ADC phase between T1 and T2 in FIG. 12. As part of the second phase of measurement, the comparator can compare the voltage of the measurement capacitor developed by the accumulation of overflow charge with a first ramping reference voltage. The first ramping reference voltage can be generated by a DAC based on count values from the free running counter.

The controller can then proceed to step 1318 to determine whether the comparator flips. If the comparator flips, the controller can proceed to step 1320 and obtain a second count value from the counter based on the flipping of the comparator, and store the second count in the memory if the memory is not locked. The second count value can represent the quantity of overflow charge stored in the measurement capacitor. As described above, the memory can be locked by the assertion of FLAG_1 signal following the storage of the first count value in the memory. If FLAG_1 signal is not asserted, the controller can store the second count value in the memory. The controller can then proceed to step 1322 to perform the third phase of measurement. If the comparator does not trip, the controller can also proceed to step 1322 to perform the third phase of measurement.

The third phase of measurement can be configured to measure a quantity of charge stored in the photodiode and can correspond to the PD ADC phase between times T3 and T4 of FIG. 12. Before the third phase of measurement begins, the measurement capacitor can be reset, and then the transfer gate M1 can be fully turned on to enable the charge stored in the photodiode to flow to the measurement capacitor to develop a voltage, between times T2 and T3. The measurement capacitor capacitance can also be reduced (e.g., by disconnecting CEXT from COF) to improve the charge-to-voltage conversion gain. The voltage can then be compared against a second ramping reference voltage, which can be generated by the DAC based on count values from the free running counter, in step 1322.

The controller can then proceed to step 1324 to determine whether the comparator flips. If the comparator flips, the controller can proceed to step 1326 and obtain a third count value from the counter based on the flipping of the comparator. The third count value can represent the quantity of charge stored in the photodiode and transferred to the measurement capacitor. The controller can then proceed to step 1328 to determine whether the photodiode saturates. If the comparator does not flip in step 1324, the controller can also proceed to step 1328 to determine whether the photodiode saturates. The determination of whether the photodiode saturates in step 1328 can be based on the flipping of the comparator in the second phase of measurement, or based on the flipping of the comparator in the third phase of measurement.

The controller can then determine whether the memory is locked based on, for example, the value of FLAG_1 signal. If the memory is locked, the controller can proceed to step 1332 to keep the first count value or the second count value stored in the memory. If the memory is not locked, the controller can proceed to step 1334 to store the third count in the memory if the photodiode saturates.

Figure 15:
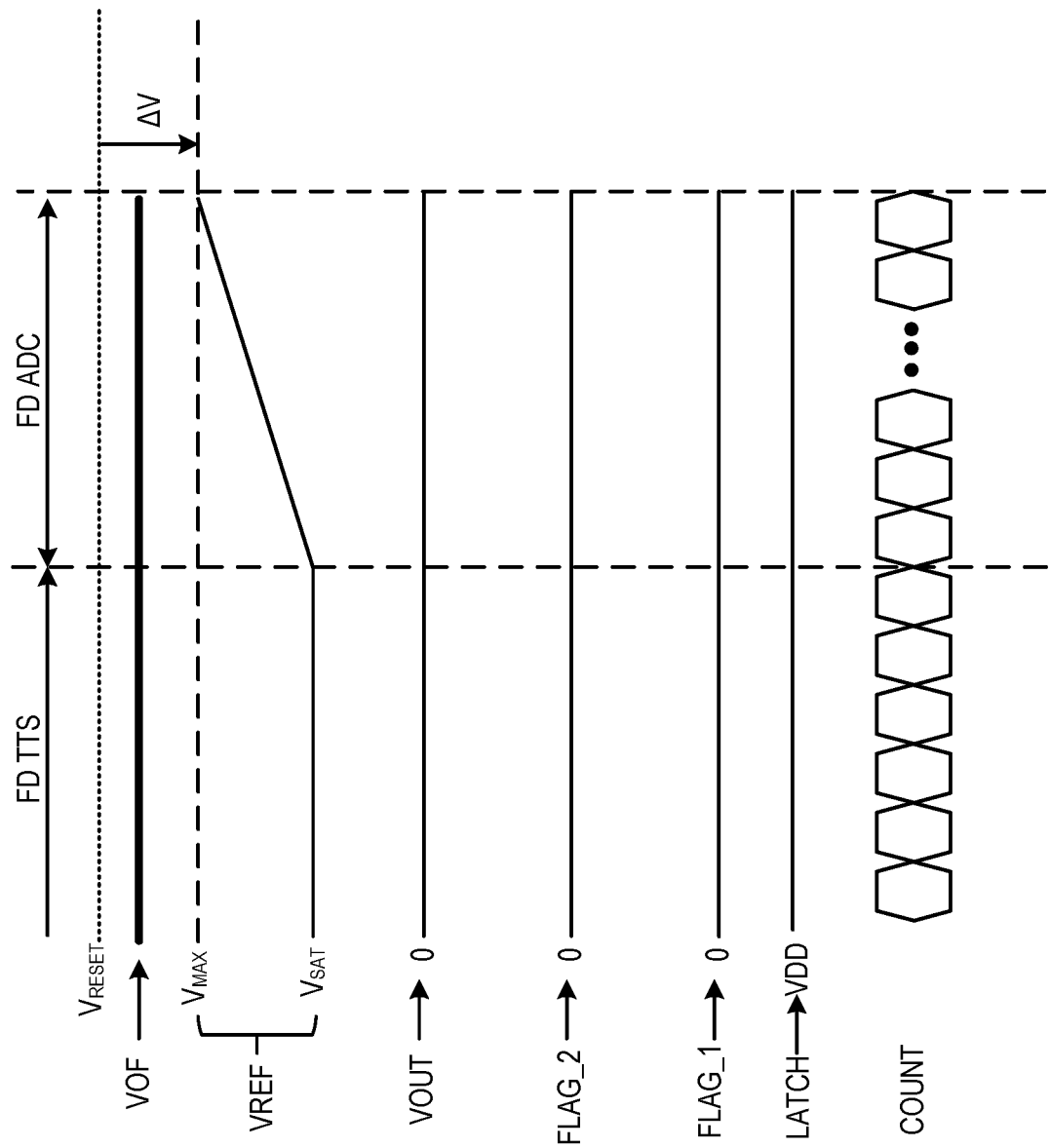
FIG. 15 illustrates an example sequence of control signals for the example process of FIG. 14.

As described above, the determination of whether the photodiode saturates can be based on the flipping of the comparator in the second phase of measurement. FIG. 14 illustrates an example of process 1400 in which the determination of whether the photodiode saturates, and the determination of whether to store the third count value in the memory is based on the flipping of the comparator in the second phase of measurement. Process 1400 can follow the first phase of measurement of FIG. 13A, or can be a standalone process (e.g., targeted at medium and low light intensity measurements). FIG. 15 illustrates a sequence of control signals involved in process 1400.

Process 1400 starts with step 1402, in which the comparator compares the voltage developed at the measurement capacitor with a first ramping reference voltage in the second phase of measurement. The second phase of measurement of step 1402 can be identical to step 1316 of FIG. 13B and correspond to the FD ADC phase of FIG. 12. The voltage range of the first ramping reference voltage (e.g., the maximum voltage) is set based on a quantity of noise charge deposited by dark current.

FIG. 15 illustrates an example of the first ramping reference voltage. As shown in FIG. 15, the reference voltage was previously set at $V_{SAT}$ during the first phase of measurement (time-to-saturation measurement). The voltage of the OF node (represented by the label VOF in FIG. 15) represents the voltage across the measurement capacitor, and can be equal to $V_{SAT}$ when the measurement capacitor is close to saturation. Therefore, $V_{SAT}$ can correspond to the maximum quantity of charge accumulated at the measurement capacitor. In addition, following the reset of the measurement capacitor in the first reset phase, the VOF voltage can be at the reset voltage $V_{RESET}$. Ideally, $V_{RESET}$ can be used as a threshold to detect whether there is overflow charge accumulated at the measurement capacitor, which can indicate whether the photodiode saturates. Ideally the VOF voltage should be equal to $V_{RESET}$ if the photodiode does not saturate and no (or very little) overflow charge is accumulated at the measurement capacitor. But due to the presence of dark current, even when there is no overflow charge, the dark current can deposit noise charge at the measurement capacitor, which can bring down the VOF voltage to a level below $V_{RESET}$. As a result, the first ramping reference voltage may cross the VOF voltage when ramping towards $V_{RESET}$ and causes the comparator to trip. The flipping of the comparator can provide a false indication that the photodiode saturates, which can cause the controller to discard the third count value obtained from the third phase measurement. As a result, the controller may use a false count value to represent the incident light intensity, which leads to substantial error in the light intensity measurement.

To reduce the likelihood of false indication of photodiode saturation, the maximum voltage of the first ramping reference voltage can be set at a level below reset voltage $V_{RESET}$. As shown in FIG. 15, the maximum voltage of the first ramping reference voltage, represented by $V_{MAX}$, can be below $V_{RESET}$ by a voltage offset $\Delta V_{dark}$. The voltage offset $\Delta V_{dark}$ can be based on a quantity of dark signal $Q_{noise}$ deposited by a dark current $I_{dark}$ within the exposure period $T_{exposure}$, as well as the capacitance of the measurement capacitor $C_{measurement}$, according to the following equation:

$$\Delta V_{dark} = \frac{Q_{noise}}{C_{measurement}} = \frac{I_{dark} \times T_{exposure}}{C_{measurement}} \quad \text{(Equation 1)}$$

In Equation 1, the dark current $I_{dark}$ can be a predicted quantity based on, for example, a device model of transistor M1.

As shown in FIG. 15, with the maximum voltage of the first ramping reference voltage being limited at $V_{MAX}$, even if VOF voltage (for zero or very little overflow charge) is brought down to below $V_{RESET}$ due to dark current, the first ramping reference voltage does not cross the VOF voltage, and the comparator does not trip. As a result, the false indication of photodiode saturation due to dark current can be prevented. As the comparator does not trip, the FLAG_2 signal remains de-asserted, which allows the controller to store the third count value from the third phase measurement in the memory to represent the incident light intensity.

Referring back to FIG. 14, the controller can then determine whether comparator flips, in step 1404. If the comparator flips, the controller can obtain the second count value from the counter, in step 1406. The flipping of the comparator can also indicate the photodiode is saturated, and that third count value generated from the third phase measurement can be discarded. If the controller determines that the memory is not locked by the first phase of measurement (e.g., based on the FLAG_1 signal being de-asserted), in step 1408, the controller can proceed to step 1410 to store the second count value in the memory, and then lock the memory, in step 1412. Step 1412 can be performed by, for example, asserting the FLAG_2 signal to prevent storing the third count value into the memory. The comparator then proceeds to step 1414 to perform the third phase of measurement. Moreover, if the comparator does not flip in step 1404, and/or if the memory is locked in step 1408, the controller may also proceed to step 1414 to perform the third phase of measurement. The third phase of measurement can be identical to step 1322 of FIG. 13B and can correspond to the PD ADC phase of FIG. 12, which includes transferring the charge stored in the photodiode to the measurement capacitor to develop a voltage, and comparing the voltage with a second ramping reference voltage, as described above.

The controller can then determine whether the comparator flips, in step 1416. If the comparator flips, the controller can obtain the third count value from the counter based on the flipping of the comparator, in step 1418. Step 1418 can be identical to step 1326 of FIG. 13B. If the controller determines that the memory is not locked (e.g., based on both FLAG_1 and FLAG_2 signals being de-asserted) in step 1420, the controller can store the third count in the memory, in step 1418. If the controller determines that the memory is locked (e.g., based on one of the FLAG_1 or FLAG _2 signals being asserted) in step 1420, the controller can keep the first count value or the second count value in the memory, in step 1422. If the comparator does not flip in step 1416, the controller can also proceed to step 1424 and keep the first count value or the second count value in the memory.

Although adjusting the maximum voltage of the first ramping reference voltage by a $\Delta V_{dark}$ value to account for noise charge introduced by dark current, as shown in FIG. 15, can mitigate the risk of false detection of photodiode saturation in the second phase of measurement (FD ADC phase to measure overflow charge), such arrangements can reduce the quantization range for the second phase of measurement. Moreover, a gap may also result at the transition between the low intensity range measurement (PD ADC phase) and the medium intensity range measurement (FD ADC phase), such that a certain intensity range may not be quantized. The reduction in the quantization range for the second phase of measurement, as well as the gap in the transition, may increase with the dark current. Moreover, the dark current is temperature dependent and is also not well-controlled by process technologies. It may be difficult to set a $\Delta V_{dark}$ to accommodate dark current for the whole temperature range and to account for process variations.

In some examples, the detection of photodiode saturation can be performed in the third phase of measurement (PD ADC phase), which can address some of the challenges described above. The third phase of measurement comprises measuring a quantity charges stored in the photodiode. Photodiode saturation can be detected by comparing the quantity of charges with a threshold related to the storage capacity of the photodiode. One advantage of performing photodiode saturation detection based on the charge stored in the photodiode is that photodiode has much less dark current. As a result, dark current can exert a much smaller error to the photodiode saturation detection. Moreover, the storage capacity of the photodiode is typically not temperature dependent and is more well-controlled by process technologies. As a result, the likelihood of false detection of photodiode saturation due to temperature and/or charge storage capacity variation can be reduced.

Figure 17:
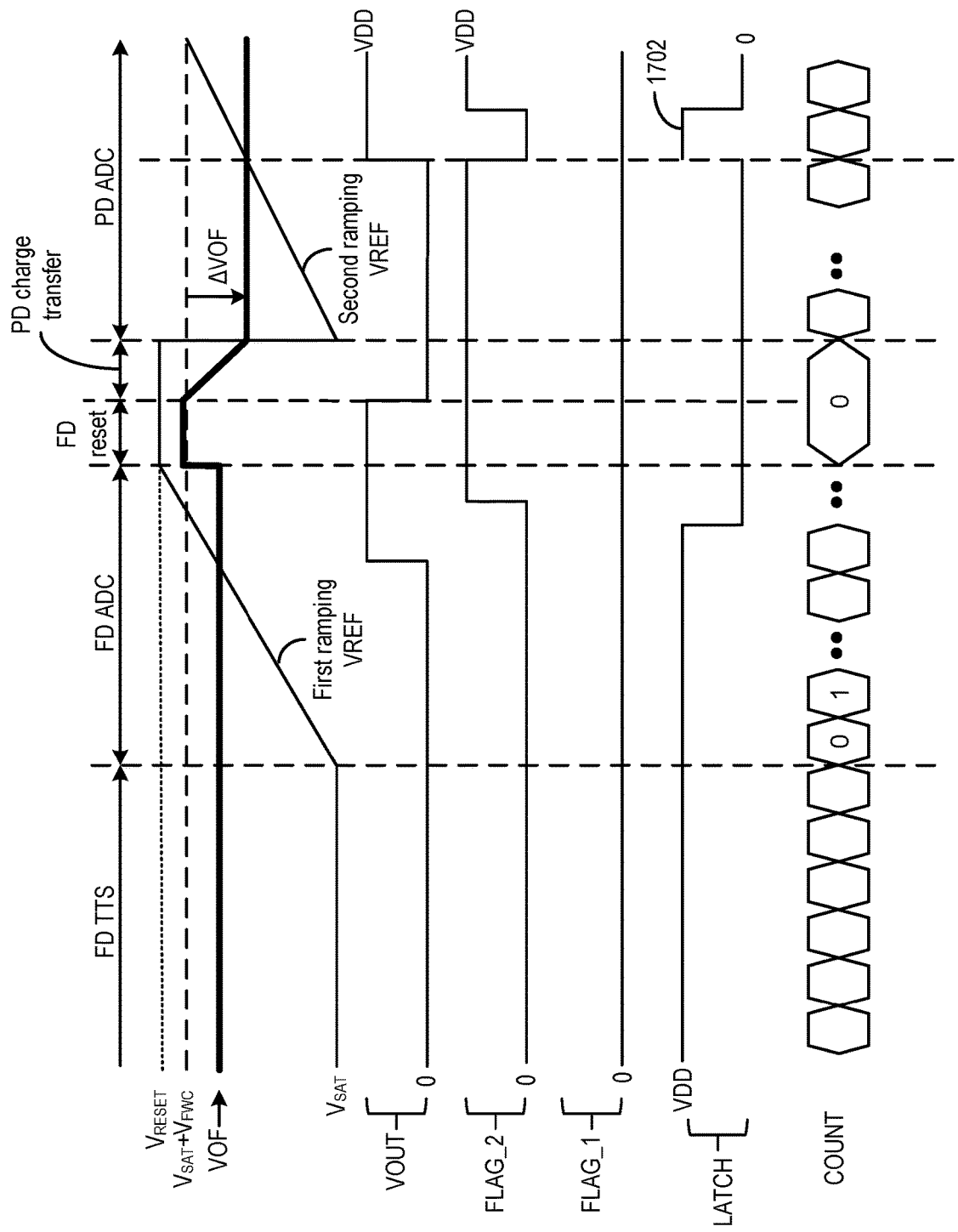
FIG. 17 illustrates an example sequence of control signals for the example process of FIG. 16.

FIG. 16 illustrates an example of process 1600 in which the determination of whether the photodiode saturates, and the determination of whether to store the third count value in the memory, is based on the flipping of the comparator in the third phase of measurement. Process 1600 can follow the first phase of measurement of FIG. 13A, or can be a standalone process (e.g., targeted at medium and low light intensity measurements). FIG. 17 illustrates a sequence of control signals involved in process 1600.

Process 1600 starts with step 1602, in which the comparator compares the voltage developed at the measurement capacitor with a first ramping reference voltage in the second phase of measurement. The second phase of measurement of step 1602 can be identical to step 1316 of FIG. 13B and correspond to FD ADC phase of FIG. 12. The maximum voltage of the first ramping reference voltage can be set to $V_{RESET}$, to maximize the quantization range for the overflow charge.

The controller can then determine whether the comparator flips, in step 1604. If the comparator flips, the controller can obtain the second count value from the counter, in step 1606. If the memory is not locked by the first phase of measurement (e.g., based on FLAG_1 signal being de-asserted), in step 1608, the controller can proceed to step 1610 to store the second count value in the memory, and assert an overflow flag bit (e.g., FLAG_2 signal) in step 1612. The assertion of the overflow flag bit can prevent the third phase measurement from overwriting the second count value with the third count value but, as to be described below, the overflow flag bit can be de-asserted based on photodiode saturation detection in the third phase measurement result, to allow storage of the third count value. The comparator then proceeds to step 1614 to perform the third phase of measurement. Moreover, if the comparator does not flip in step 1604, and/or if the memory is locked in step 1608, the controller may also proceed to step 1614 to perform the third phase of measurement.

The third phase of measurement can be identical to step 1322 of FIG. 13B and can correspond to the PD ADC phase of FIG. 12, which includes transferring the charge stored in the photodiode to the measurement capacitor to develop a voltage, and comparing the voltage with a second ramping reference voltage. The voltage range $V_{FWC}$ of the second ramping reference can be set based on the full well capacity of the photodiode $Q_{FWC}$, as well as a conversion gain G of the measurement capacitor, as follows:

$$V_{FWC}=Q_{FWC} \times G \quad \text{(Equation 2)}$$

In Equation 2, $Q_{FWC}$ can represent a nominal/average full well capacity of the photodiode among a group of photodiodes fabricated on the same wafer and/or with the same process technology. As to be described in more detail below, $V_{FWC}$ can be offset to account for potential variation in the full well capacity of the photodiodes, such as when a photodiode has a full well capacity below the nominal/average full well capacity $Q_{FWC}$.

Referring to FIG. 17, prior to the third phase of measurement, the OF node voltage (VOF) can be reset to $V_{SAT}+V_{FWC}$. Charge stored in the photodiode can then be transferred to the measurement capacitor to bring down VOF from the reset voltage, with $\Delta$VOF representing the quantity of charge stored in the photodiode and transferred to the measurement capacitor. If the photodiode saturates, $\Delta$VOF can be equal to $V_{FWC}$, and VOF can reach $V_{SAT}$ or below. As the second ramping reference voltage ramps from $V_{SAT}$ to $V_{SAT} V_{FWC}$, the second ramping reference voltage may not reach VOF, and the comparator may not flip. If the photodiode does not saturate, $\Delta$VOF will be smaller $V_{FWC}$, and VOF is above $V_{SAT}$. The second ramping reference voltage can reach FOF and cause the comparator to flip, as shown in FIG. 17.

Referring back to FIG. 16, the controller can then determine whether comparator flips, in step 1616. If the comparator flips, the controller can obtain the third count value from the counter based on the flipping of the comparator, in step 1618. Step 1618 can be identical to step 1326 of FIG. 13B. As described above, the flipping of the comparator can also signal that the photodiode does not saturate. Based on the flipping of the comparator, the controller also de-asserts the overflow flag bit (e.g., FLAG_2 signal) in step 1620, and store the third count in the memory in step 1622. As shown in FIG. 17, the de-assertion of the overflow flag bit can create a latch pulse 1702 to control the memory to latch in the third count value. After the third count value is latched into the memory, FLAG_2 signal can be re-asserted to prevent the memory from latching in subsequent count values from the counter.

Referring back to FIG. 16, if the comparator does not flip in step 1616, the controller can proceed to step 1624 and keep the first count value or the second count value in the memory. For example, if the comparator does not flip in step 1616, the FLAG_2 signal can remain asserted, which can de-assert the latch signal and prevent the memory from storing new count value.

As described above, the voltage range $V_{FWC}$ of the second ramping reference can be set based on the nominal/average full well capacity of the photodiode $Q_{FWC}$. $V_{FWC}$ can be offset to account for potential variation in the full well capacity of a photodiode with respect to $Q_{FWC}$. The offsetting of $V_{FWC}$ can reduce the likelihood of false detection of photodiode saturation in the third phase of measurement due to the variation. For example, a photodiode may have a smaller full well capacity than $Q_{FWC}$. Even if the photodiode saturates, the $\Delta$VOF, which represents the quantity of charge stored in the photodiode, will be smaller $V_{FWC}$. The comparator may flip in the third phase of measurement and incorrectly indicate that the photodiode does not saturate. As a result, the second count value obtained from the second phase of measurement (FD ADC) will be discarded, and the overflow charge is excluded from the incident light intensity measurement output, which leads to measurement error.

To reduce the likelihood of measurement error due to full well capacity variation, the voltage range of the second ramping reference can be configured as $V_{FWC}'$, which is offset from $V_{FWC}$ by an offset $\Delta V_{var}$. The new voltage range $V_{FWC}'$ can represent a reduced full well capacity $Q_{FWC\_low}$, as follows:

$$V_{FWC}' = V_{FWC} - \Delta V_{var} = Q_{FWC\_low} \times G \quad \text{(Equation 3)}$$

The offset $\Delta V_{var}$ can be set based on a distribution of full well capacity of a plurality of photodiodes on a wafer and/or fabricated using the same process technology. For example, $\Delta V_{var}$ can be set such that a certain percentage of the photodiodes (e.g., 99.95%) have full well capacity above $Q_{FWC\_low}$ based on the distribution. The percentage can be determined based on, for example, a tolerated/target measurement error, or a tolerated/target error rate of determining the photodiode saturates based on the flipping of the comparator in the third phase of measurement.

Specifically, the error of determining the photodiode saturates occurs when the full well capacity of the photodiode exceeds $Q_{FWC\_low}$ such that the second ramping reference can cross VOF without the photodiode being saturated, as the photodiode can store more charge than $Q_{FWC\_low}$. Based on the tolerated/target error rate, a target likelihood of any given photodiode having a full well capacity below $Q_{FWC\_low}$ can be determined. The value of $Q_{FWC\_low}$ can then be determined based on the target likelihood and the distribution of full well capacity of the photodiodes.

As an illustrative example, if the tolerated/target measurement error is 0.05%, the target likelihood of any given photodiode having a full well capacity below $Q_{FWC\_low}$ can be 0.05% as well. Therefore, $Q_{FWC\_low}$ can be selected such that 99.95% of photodiodes have full well capacity above $Q_{FWC\_low}$, such that there is 0.05% chance (100%-99.95%) of any given photodiode having a full well capacity above $Q_{FWC\_low}$ which can lead to a false indication of saturation when the second ramping reference crosses the VOF voltage as described above.

Just like the setting of offset $\Delta V_{dark}$ in the first phase of measurement, the setting of offset $\Delta V_{var}$ can also reduce the quantization range for the third phase of measurement. A gap may also result at the transition between the low intensity range measurement (PD ADC phase) and the medium intensity range measurement (FD ADC phase), such that a certain intensity range may not be quantized. But given that the variation of pixel full well capacity is typically much better controlled than the dark current, the offset $\Delta V_{var}$ can be made much smaller than the offset $\Delta V_{dark}$, which can reduce the effect on the quantization range as well as the gap in the transition between PD ADC and FD ADC.

The following examples are provided to illustrate the second phase and third phase of measurement operations of FIG. 16 and FIG. 17. In the following example, The nominal/average PD full well capacity of the pixel array is $Q_{FWC}$ is 5000e-. 99.99% pixels have a full well capacity larger than $Q_{FWC\_low}$ of 4950e-. G can be equal to 200 uV/e-. the voltage range $V_{FWC}$, given by $Q_{FWC}*G$, equals to 1V. $V_{FWC}$ can be set based on $Q_{FWC\_low}*G$ based on Equation 3 above, where G is 0.99V. For a pixel with full well capacity of 4960e-, the following three cases may happen:

Case 1: PD stores a quantity of charge of 2000e-. The comparator flips during the PD ADC phase, as determined in step 1616. FLAG_2 can be de-asserted in step 1620, and the third count value from the PD ADC phase, which corresponds to 2000e-, can be stored in the memory in step 1622 to represent the incident light intensity.

Case 2: PD stores a quantity of charge of 4955e-. The comparator does not flip, as determined in step 1616, which indicates that the photodiode saturates. Even 4955e- is smaller than the actual full well capacity of the PD which is 4960e-, it is very close. FLAG_2 signal can be asserted in step 1620, and the second count value stored in the memory during the FD ADC phase can be kept in the memory in step 1624 and provided to represent the incident light intensity.

Case 3: Total signal is 7000e- which is split between the PD and the measurement capacitor. PD has 4960e-, and the quantity of overflow charge at the measurement capacitor is 2040e-. The comparator does not flip in step 1616, which indicates that the photodiode saturates. FLAG _2 signal can be asserted in step 1620, and the second count value stored in the memory, during the FD ADC phase, which represents the 2040e- overflow charge, can be kept in the memory in step 1624 and provided to represent the incident light intensity.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
a photodiode;
a charge storage unit; and
an analog-to-digital converter (ADC) circuit configured to:
in a first mode of measurement:
compare a first voltage representing a quantity of overflow charge stored at the charge storage unit against a first ramping voltage to generate a first decision; and
obtain, based on the first decision, a first digital value;
in a second mode of measurement:
compare a second voltage representing a quantity of residual charge stored in the photodiode against a second ramping voltage to generate a second decision; and
obtain, based on the second decision, a second digital value;
determine, based on one of the first decision or the second decision,
whether the photodiode saturates; and
based on whether the photodiode saturates, output the first digital value or the second digital value to represent an intensity of incident light.

2. The apparatus of claim 1, wherein the second mode of measurement is performed after the first mode of measurement.

3. The apparatus of claim 2, further comprising:
a counter configured to generate count values;
a memory; and
a register configured to store a flag to indicate whether the photodiode saturates;
wherein the ADC circuit is configured to:
store, based on the first decision, a first count value from the counter as the first digital value in the memory; and
based on whether the flag indicates the photodiode saturates, either maintain the first digital value in the memory or overwrite the first digital value with a second count value from the counter as the second digital value.

4. The apparatus of claim 3, wherein the determination of whether the photodiode saturates is based on the first decision; and
wherein a voltage range of the first ramping voltage is based on a predicted quantity of dark current at a floating drain node, the floating drain node being part of the charge storage unit.

5. The apparatus of claim 4, wherein the voltage range of the first ramping voltage is further based on a predicted quantity of noise charge deposited by the dark current within an exposure period, and a charge storage capacity of the charge storage unit.

6. The apparatus of claim 4, wherein the ADC circuit is configured to, based on determining that the photodiode saturates in the first mode of measurement:
set the flag to a first value to indicate that the photodiode saturates in the first mode of measurement; and
keep the first digital value in the memory without overwriting the first digital value with the second digital value in the memory in the second mode of measurement based on the first value of the flag.

7. The apparatus of claim 4, wherein the ADC circuit is configured to, based on determining that the photodiode does not saturate in the first mode of measurement:
set the flag to a second value to indicate that the photodiode does not saturate in the first mode of measurement; and
store the second digital value in the memory in the second mode of measurement based on the second value of the flag.

8. The apparatus of claim 3, wherein the determination of whether the photodiode saturates is based on the second decision.

9. The apparatus of claim 8, wherein the ADC circuit is configured to set the flag to a first value to indicate the photodiode saturates based on the first decision in the first mode of measurement; and
wherein the ADC circuit is configured to, in the second mode of measurement:
determine, based on the second decision, whether the photodiode saturates; and
based on the second decision, either set the flag to a second value to indicate the photodiode does not saturate or maintain the flag at the first value.

10. The apparatus of claim 9, wherein the ADC circuit is configured to, in the second mode of measurement: store the second digital value in the memory based on the flag being set to the second value, or keep the first digital value in the memory based on the flag being maintained at the first value.

11. The apparatus of claim 8, wherein a voltage range of the second ramping voltage is based on a full well capacity of the photodiode.

12. The apparatus of claim 11, wherein the voltage range of the second ramping voltage is configured based on a distribution of full well capacities among a plurality of photodiodes that are fabricated using the same process technology as the photodiode.

13. The apparatus of claim 12, wherein the voltage range of the second ramping voltage is configured based on a product between a conversion gain and a value representing a first full well capacity, the first full well capacity being lower than a pre-determined percentage of the full well capacities of the plurality of photodiodes based on the distribution.

14. The apparatus of claim 13, wherein the percentage is determined based on a pre-determined target likelihood of the voltage range of the second ramping voltage exceeding a full well capacity of the photodiode and based on the distribution.

15. The apparatus of claim 14, wherein the target likelihood of the voltage range of the second ramping voltage exceeding the full well capacity of the photodiode is determined based on a tolerated error rate of determining whether the photodiode saturates based on the second decision.

16. A method comprising:
in a first mode of measurement:
comparing a first voltage representing a quantity of overflow charge from a photodiode and stored in a charge storage unit against a first ramping voltage to generate a first decision; and obtaining, based on the first decision, a first digital value;

in a second mode of measurement:

comparing a second voltage representing a quantity of residual charge stored in the photodiode to generate a second decision; and obtaining, based on the second decision, a second digital value;

determining, based on one of the first decision or the second decision, whether the photodiode saturates; and based on whether the photodiode saturates, outputting the first digital value or the second digital value to represent an intensity of incident light.

17. The method of claim 16, wherein the second mode of measurement is performed after the first mode of measurement.

18. The method of claim 16, wherein the determination of whether the photodiode saturates is based on the first decision; and wherein a voltage range of the first ramping voltage is based on a predicted quantity of dark current at a floating drain node which is part of the charge storage unit.

19. The method of claim 16, wherein the determination of whether the photodiode saturates is based on the second decision; and wherein a voltage range of the second ramping voltage is based on a full well capacity of the photodiode.

20. The method of claim 19, wherein the voltage range of the second ramping voltage is further configured based on a distribution of full well capacities among a plurality of photodiodes that are fabricated using the same process technology as the photodiode.

* * * * *